US012757101B2

(12) United States Patent
Chen et al.

(10) Patent No.: US 12,757,101 B2
(45) Date of Patent: Oct. 6, 2026

(54) METHOD AND DEVICE FOR WIRELESS COMMUNICATION

(71) Applicant: BUNKER HILL TECHNOLOGIES LLC, Allen, TX (US)

(72) Inventors: Yu Chen, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 298 days.

(21) Appl. No.: 18/434,755

(22) Filed: Feb. 6, 2024

(65) Prior Publication Data

US 2024/0179611 A1 May 30, 2024

Related U.S. Application Data

(63) Continuation of application No. PCT/CN2022/120891, filed on Sep. 23, 2022.

(30) Foreign Application Priority Data

Sep. 26, 2021 (CN) ......................... 202111130089.X
Nov. 9, 2021 (CN) ......................... 202111318202.7

(51) Int. Cl.
*H04W 76/19* (2018.01)
*H04W 40/12* (2009.01)
*H04W 40/22* (2009.01)

(52) U.S. Cl.
CPC ........... *H04W 40/22* (2013.01); *H04W 40/12* (2013.01); *H04W 76/19* (2018.02)

(58) Field of Classification Search
None
See application file for complete search history.

(56) References Cited

U.S. PATENT DOCUMENTS

2019/0029061 A1* 1/2019 Feng ..................... H04W 80/08
2021/0144606 A1 5/2021 Xu et al.
(Continued)

FOREIGN PATENT DOCUMENTS

CN 108353448 A 7/2018
CN 109417695 A 3/2019
(Continued)

OTHER PUBLICATIONS

ISR received in application No. PCT/CN2022/120891 dated Dec. 15, 2022.

(Continued)

*Primary Examiner* — The Hy Nguyen
(74) *Attorney, Agent, or Firm* — Ascenda Law Group, PC

(57) ABSTRACT

In a method, a first message indicating a switch from a direct path to an indirect path is received, and a first timer is started. Expiration of the first timer triggers radio resource control (RRC) re-establishment. A first signal is received on a sidelink after starting the first timer and before expiration of the first timer, and the first timer is stopped in response to receiving the first signal. A second message providing feedback of the first message is transmitted. The first message is transmitted via the direct path, and the second message is transmitted via the indirect path. The first and second messages are RRC messages, and the second message is relayed by a transmitter of the first signal. Receipt of the first message and the first signal enables a path switch.

20 Claims, 6 Drawing Sheets

(56) References Cited

U.S. PATENT DOCUMENTS

| | | | | |
|---|---|---|---|---|
| 2021/0227464 | A1 | 7/2021 | Kung et al. | |
| 2022/0377822 | A1* | 11/2022 | Wang | H04W 76/14 |
| 2023/0073469 | A1* | 3/2023 | Wang | H04W 40/22 |
| 2024/0179786 | A1* | 5/2024 | Yao | H04W 36/033 |
| 2024/0214848 | A1* | 6/2024 | Kang | H04W 40/22 |
| 2025/0133537 | A1* | 4/2025 | Back | H04W 92/18 |

FOREIGN PATENT DOCUMENTS

| | | | |
|---|---|---|---|
| CN | 110876168 | A | 3/2020 |
| CN | 109417695 | B | 10/2020 |
| CN | 113365223 | A | 9/2021 |
| WO | 2021185227 | A1 | 9/2021 |

OTHER PUBLICATIONS

OPPO"Left issues on UP aspects for service continuity" 3GPP TSG-RAN WG2 #115-e R2-2107196 Aug. 31, 2021.

"Draft Email Report of [AT115-e][609][Relay] Service continuity procedures", MediaTek Inc., 3GPP TSG-RAN WG2 Meeting #115-e, Draft R2-2108939, Electronic Meeting, Aug. 9-27, 2021, 33 pgs.

"Feature summary for 8.7.2.2", Ericsson, 3GPP TSG-RAN WG2 Meeting #115-e, R2-2108196, Electronic Meeting, Aug. 9-27, 2021, 8 pgs.

"Service Continuity for L2 UE to NW Relays", InterDigital Inc., 3GPP RAN WG2 Meeting #114 electronic, R2-2104872, Online, May 2021, 6 pgs.

"Control Plane Procedure: Connection Establishment", LG Electronics Inc., 3GPP TSG-RAN WG2 Meeting #115e, R2-2108154, Online Meeting, Aug. 16-Aug. 27, 2021, 4 pgs.

First Office Action dated May 16, 2025, from the CN State Intellectual Property Office, for CN Application No. 202111318202.7, 10 pgs.

Search Report dated May 14, 2025, from the CN State Intellectual Property Office, for CN Application No. 202111318202.7, 6 pgs.

International Preliminary Report on Patentability issued Mar. 26, 2024, from The International Bureau of WIPO, for International Patent Application No. PCT/CN2022/120891 (filed Sep. 23, 2022), 8 pgs.

Written Opinion of the International Searching Authority mailed Dec. 15, 2022, from the ISA/CN, for International Patent Application No. PCT/CN2022/120891 (filed Sep. 23, 2022), 6 pgs.

The Second Office Action issued Sep. 21, 2025, from The State Intellectual Property Office of People's Republic of China, for CN Application No. 202111318202.7, 8 pgs.

* cited by examiner

METHOD AND DEVICE FOR WIRELESS COMMUNICATION

This application is a continuation of the international patent application-International Patent Application No. PCT/CN2022/120891, filed on Sep. 23, 2022, and claims the priority benefit of Chinese Patent Application No. 202111318202.7, filed on Nov. 9, 2021, and Chinese Patent Application No. 202111130089.X, filed on Sep. 26, 2021, the full disclosure of which is incorporated herein by reference.

BACKGROUND

Technical Field

The present application relates to transmission methods and devices in wireless communication systems, and in particular to a method and device in wireless communications for reducing traffic interruption, enhancing traffic continuity, and improving the reliability and security.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In communications, both Long Term Evolution (LTE) and 5G NR involves correct reception of reliable information, optimized energy efficiency ratio (EER), determination of information validity, flexible resource allocation, elastic system structure, effective information processing on non-access stratum (NAS), and lower traffic interruption and call drop rate, and support to lower power consumption, which play an important role in the normal communication between a base station and a User Equipment (UE), rational scheduling of resources, and also in the balance of system payload, thus laying a solid foundation for increasing throughput, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X), and Device to Device (D2D), Unlicensed Spectrum communications, and monitoring on UE communication quality, network plan optimization, Non Terrestrial Network (NTN) and Terrestrial Network (TN), Dual connectivity system, or combined, radio resource management and multi-antenna codebook selection, as well as signaling design, neighbor management, traffic management and beamforming. Information is generally transmitted by broadcast and unicast, and both ways are beneficial to fulfilling the above requests and make up an integral part of the 5G system. The UE's connection with the network can be achieved directly or by relaying.

As the number and complexity of system scenarios increases, more and more requests have been made on reducing interruption rate and latency, strengthening reliability and system stability, increasing the traffic flexibility and power conservation, and in the meantime the compatibility between different versions of systems shall be taken into account for system designing.

The 3GPP standardization organization has worked on 5G standardization to formulate a series of specifications such as 38.304, 38.211, and 38.213, of which the details can refer to:

https://www.3gpp.org/ftp/Specs/archive/38_series/38.304/38304-g40.zip https://www.3gpp.org/ftp/Specs/archive/38_series/38.211/38211-g50.zip https://www.3gpp.org/ftp/Specs/archive/38_series/38.213/38213-g50.zip

SUMMARY

The relay can be used in various communication scenarios, for instance, when a UE is not within coverage of a cell, it can be accessible to the network via the relay, where the relay node can be another UE. The relay generally includes L3 relay and L2 relay, both of which provide the service of access to the network for a remote UE via a relay node. The L3 relay is transparent to the access network, namely, a remote UE only establishes connection with the core network, so the access network cannot recognize whether data is from a remote node or a relay node; while in the L2 relay, a remote node is RRC_Connected with an access network, where the access network can manage the remote node, and a radio bearer can be established between the access network and the remote node. In some cases, especially when signals from a remote UE transmitted through a direct path become weaker, and there is an available relay node in the neighborhood, the network will indicate, according to information like a measurement report of the remote UE, that the remote UE switches from a direct-path transmission to an indirect-path transmission, i.e., from directly connecting to the network to connecting to the network via relay. However, the remote UE is not always successful in the procedure of switching from a direct path to an indirect path. In order to prevent unrestricted waiting or attempts of the remote UE, it is necessary to set a timer, and issues such as how to control this timer, namely, when should the timer be stopped, and how to deal with the timer upon its expiration all shall be addressed. If handled improperly, the delay will be too long or the communications may be interrupted. Besides, this timer is used for a switch from a direct-path transmission to an indirect-path transmission, rather than any other kind of timer traditionally used for direction communication with the network or related when simply using a sidelink for transmission, so that such a special scenario shall be dealt with in a special way. Besides, how to determine that an indirect-path transmission has already been established successfully is also a problem to be solved.

To address the above problem, the present application provides a solution.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict.

The present application provides a method in a first node for wireless communications, comprising:

receiving a first message, the first message indicating a switch from a direct path to an indirect path; and starting a first timer; an expiration of the first timer triggering an RRC re-establishment;

receiving a first signal on a sidelink after the action of starting a first timer and before the expiration of the first timer; and stopping the first timer as a response to receiving the first signal; and transmitting a second message, the second message used for feedback of the first message;

herein, the first message is transmitted via the direct path; the second message is transmitted via the indirect path; the first message and the second message are RRC messages, respectively; the second message is relayed by a transmitter of the first signal; the first message is used for the action of starting the first timer.

In one embodiment, a problem to be solved in the present application includes: how to use a timer for controlling a procedure of handover in scenarios relating to the relay, particularly during a handover or a switch from a direct path to an indirect path.

In one embodiment, an advantage of the above method includes: the method proposed by the present application can be used to avoid potential occurrences of unsuccessful handovers reflected by waiting for too long or having no response during a switch from a direct-path transmission to an indirect-path transmission, and can stop the timer upon the determination of the usage of indirect-path transmission, thus avoiding procedures such as RRC re-establishment.

Specifically, according to one aspect of the present application, the first signal comprises any data packet generated by a transmitter of the first message.

Specifically, according to one aspect of the present application, the first signal comprises a first signaling, the first signaling for indicating that the indirect path has been established.

Specifically, according to one aspect of the present application, the first signal comprises a second signaling, the second signaling for acknowledging that a direct link between the first node and a transmitter of the first signal has been successfully established; the second signaling comprises a relay service code; the second signaling is a PC5-S message.

Specifically, according to one aspect of the present application, receiving a first discovery message, the first discovery message comprising a first cell identity, the first cell identity being a cell identity of a transmitter of the first message; the first discovery message comprising a first link-layer identity of the transmitter of the first signal; and evaluating a first measurement result according to a first reference signal resource; and evaluating a second measurement result according to a sidelink signal transmitted by a transmitter of the first discovery message; and transmitting a third message via the direct path, the third message indicating the first link-layer identity;

herein, the first message indicates a switch from a direct path to an indirect path when a first condition is satisfied; the first condition comprises that the first measurement result is lower than a first threshold and the second measurement result is higher than a second threshold; the first message comprises the first link-layer identity; the first condition is satisfied; a configuration associated with the first condition in the first message being performed is used for triggering a start of the first timer.

Specifically, according to one aspect of the present application, the RRC re-establishment comprises: selecting a third node, the third node belonging to a first candidate relay list, the first candidate relay list being related to a switch from a direct path to an indirect path; transmitting an RRC re-establishment request message via the third node using the indirect path; and deleting the first candidate relay list as a response to applying the first message;

herein, during a procedure while the first message is applied, a first candidate cell list is reserved, the first candidate cell list being related to a conditional reconfiguration; the first candidate cell list comprises at least one cell.

Specifically, according to one aspect of the present application, during a time while the first timer is running, maintaining a conditional reconfiguration evaluation for a Conditional Handover (CHO), and stopping an evaluation of a conditional switch from a direct path to an indirect path.

Specifically, according to one aspect of the present application, the first node is a UE.

Specifically, according to one aspect of the present application, the first node is a terminal of Internet of Things (IoT).

Specifically, according to one aspect of the present application, the first node is a relay.

Specifically, according to one aspect of the present application, the first node is a vehicle-mounted terminal.

Specifically, according to one aspect of the present application, the first node is an aircraft.

The present application provides a method in a first node for wireless communications, comprising:

transmitting a first message, the first message indicating a switch from a direct path to an indirect path; and receiving a second message, the second message used for feedback of the first message;

herein, a transmitter of the second message starts a first timer, where an expiration of the first timer triggers an RRC re-establishment, and receives a first signal on a sidelink after the action of starting a first timer and before the expiration of the first timer; the first signal is used for stopping the first timer; the first message is transmitted via the direct path; the second message is transmitted via the indirect path; the first message and the second message are RRC messages, respectively; the second message is relayed by a transmitter of the first signal; the first message is used for the action of starting the first timer.

Specifically, according to one aspect of the present application, receiving a third message via the direct path, the third message indicating the first link-layer identity; a first reference signal resource is used for evaluating a first measurement result; a sidelink signal is used for evaluating a second measurement result;

herein, the first message indicates a switch from a direct path to an indirect path when a first condition is satisfied; the first condition comprises that the first measurement result is lower than a first threshold and the second measurement result is higher than a second threshold; the first message comprises the first link-layer identity; a configuration associated with the first condition in the first message being performed is used for triggering a start of the first timer.

Specifically, according to one aspect of the present application, the RRC re-establishment comprises: receiving an RRC re-establishment request message via the third node using the indirect path.

Specifically, according to one aspect of the present application, the second node is a base station.

Specifically, according to one aspect of the present application, the second node is a relay.

Specifically, according to one aspect of the present application, the second node is an aircraft.

Specifically, according to one aspect of the present application, the second node is a satellite.

Specifically, according to one aspect of the present application, the second node is an access-point device.

The present application provides a method in a third node for wireless communications, comprising:

forwarding a second message, the second message used for feedback of the first message;

transmitting a first signal on a sidelink after the action of starting a first timer and before the expiration of the first timer;

herein, a transmitter of the second message starts a first timer, where an expiration of the first timer is used for triggering an RRC re-establishment; the first signal is used for stopping the first timer; the first message indicating a switch from a direct path to an indirect path; the first message is transmitted via the direct path; the second message is transmitted via the indirect path; the first message and the second message are RRC messages, respectively; the first message is used for the action of starting the first timer.

Specifically, according to one aspect of the present application, the first signal comprises any data packet generated by a transmitter of the first message.

Specifically, according to one aspect of the present application, the first signal comprises a first signaling, the first signaling for indicating that the indirect path has been established.

Specifically, according to one aspect of the present application, the first signal comprises a second signaling, the second signaling for acknowledging that a direct link between the first node and the third node has been successfully established; the second signaling comprises a relay service code; the second signaling is a PC5-S message.

Specifically, according to one aspect of the present application, transmitting a first discovery message and a sidelink signal, the first discovery message comprising a first cell identity, the first cell identity being a cell identity of a transmitter of the first message; the first discovery message comprising a first link-layer identity of the third node; a first reference signal resource is used for evaluating a first measurement result; the sidelink signal is used for evaluating a second measurement result;

herein, the first message indicates a switch from a direct path to an indirect path when a first condition is satisfied; the first condition comprises that the first measurement result is lower than a first threshold and the second measurement result is higher than a second threshold; the first message comprises the first link-layer identity; a configuration associated with the first condition in the first message being performed is used for triggering a start of the first timer.

Specifically, according to one aspect of the present application, the RRC re-establishment comprises: selecting the third node, the third node belonging to a first candidate relay list, the first candidate relay list being related to a switch from a direct path to an indirect path; transmitting an RRC re-establishment request message via the third node using the indirect path; and deleting the first candidate relay list as a response to applying the first message;

herein, during a procedure while the first message is applied, a first candidate cell list is reserved, the first candidate cell list being related to a conditional reconfiguration; the first candidate cell list comprises at least one cell.

Specifically, according to one aspect of the present application, the third node is a UE.

Specifically, according to one aspect of the present application, the third node is a terminal of Internet of Things (IoT).

Specifically, according to one aspect of the present application, the third node is a relay.

Specifically, according to one aspect of the present application, the third node is a vehicle-mounted terminal.

Specifically, according to one aspect of the present application, the third node is an aircraft.

The present application provides a first node for wireless communications, comprising:

a first receiver, receiving a first message, the first message indicating a switch from a direct path to an indirect path; and starting a first timer; an expiration of the first timer triggering an RRC re-establishment;

the first receiver, receiving a first signal on a sidelink after the action of starting a first timer and before the expiration of the first timer; and stopping the first timer as a response to receiving the first signal; and a first transmitter, transmitting a second message, the second message used for feedback of the first message;

herein, the first message is transmitted via the direct path; the second message is transmitted via the indirect path; the first message and the second message are RRC messages, respectively; the second message is relayed by a transmitter of the first signal; the first message is used for the action of starting the first timer.

The present application provides a second node for wireless communications, comprising:

a second transmitter, transmitting a first message, the first message indicating a switch from a direct path to an indirect path; and a second receiver, receiving a second message, the second message used for feedback of the first message;

herein, a transmitter of the second message starts a first timer, where an expiration of the first timer triggers an RRC re-establishment, and receives a first signal on a sidelink after the action of starting a first timer and before the expiration of the first timer; the first signal is used for stopping the first timer; the first message is transmitted via the direct path; the second message is transmitted via the indirect path; the first message and the second message are RRC messages, respectively; the second message is relayed by a transmitter of the first signal; the first message is used for the action of starting the first timer.

The present application provides a third node for wireless communications, comprising:

a third transmitter, forwarding a second message, the second message used for feedback of the first message;

the third transmitter, transmitting a first signal on a sidelink after the action of starting a first timer and before the expiration of the first timer;

herein, a transmitter of the second message starts a first timer, where an expiration of the first timer is used for triggering an RRC re-establishment; the first signal is used for stopping the first timer; the first message indicating a switch from a direct path to an indirect path; the first message is transmitted via the direct path; the second message is transmitted via the indirect path; the first message and the second message are RRC messages, respectively; the first message is used for the action of starting the first timer.

In one embodiment, compared with the prior art, the present application is advantageous in the following aspects:

It can avoid system error caused due to the failure that occurs during the switch from a direct path to an indirect path.

It reduces excessive delay that arises from the failure that occurs during the switch from a direct path to an indirect path.

It sets up proper evaluation criterion to be used for evaluating the symbol of successful establishment of an indirect path, and on such basis, stopping the first timer.

It supports conditional switch from a direct path to an indirect path.

It supports mixed application of CHO and conditional switch from a direct path to an indirect path.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
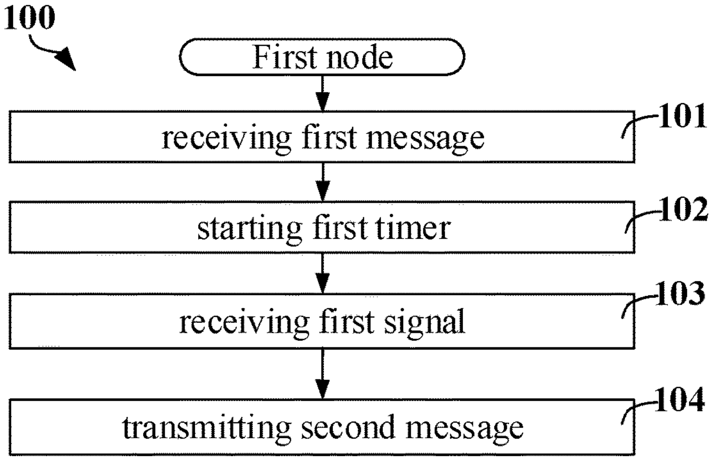
FIG. 1 illustrates a flowchart of receiving a first message, starting a first timer, receiving a first signal and transmitting a second message according to one embodiment of the present application.

Embodiment 1 illustrates a flowchart of receiving a first message, starting a first timer, receiving a first signal and transmitting a second message according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application receives a first message in step 101; starts a first timer in step 102; and receives a first signal in step 103; and transmits a second message in step 104;

herein, the first message indicates a switch from a direct path to an indirect path; an expiration of the first timer triggering an RRC re-establishment; the first node receives the first signal on a sidelink after the action of starting a first timer and before the expiration of the first timer; and the first node stops the first timer as a response to receiving the first signal; the second message is used for feedback of the first message; the first message is transmitted via the direct path; the second message is transmitted via the indirect path; the first message and the second message are RRC messages, respectively; the second message is relayed by a transmitter of the first signal; the first message is used for the action of starting the first timer.

In one embodiment, the first node is a User Equipment (UE).

In one embodiment, a direct path refers to a UE-to-Network (U2N) transmission path, so transmitting through the direct path means that data is transmitted without being relayed between a remote UE and the network in U2N transmission.

In one subembodiment, the data comprises higher-layer data and signaling.

In one subembodiment, the data comprises a bit string or a bit block.

In one subembodiment, the data only comprises signaling or data borne by a radio bearer (RB).

In one embodiment, an indirect path refers to a UE-to-Network (U2N) transmission path, so transmitting through the indirect path means that data is forwarded by a U2N relay UE between a remote UE and the network in U2N transmission.

In one subembodiment, the data comprises higher-layer data and signaling.

In one subembodiment, the data comprises a bit string or a bit block.

In one subembodiment, the data only comprises signaling or data borne by a radio bearer (RB).

In one embodiment, a U2N relay UE refers to a UE providing the function of supporting connections between a U2N remote UE and the network.

In one embodiment, a U2N remote UE refers to a UE that needs to be relayed by a U2N relay UE in communications with the network.

In one embodiment, a U2N remote UE refers to a UE in communications with the network that supports relaying traffics.

In one embodiment, a U2N relay is a U2N relay UE.

In one embodiment, when transmitting to and receiving from the network unicast traffics, the U2N relay and the U2N remote node are both in RRC_Connected state.

In one embodiment, when the U2N remote UE is in RRC_Idle state or RRC_Inactive state, the U2N relay UE can be in any RRC state, i.e., RRC_Connected state, RRC_Idle state or RRC_Inactive state.

In one embodiment, not transmitting through a direct path is equivalent to transmitting through an indirect path.

In one embodiment, not transmitting through a direct path includes transmitting via a relay.

In one embodiment, transmitting through a direct path includes not transmitting via a relay.

In one embodiment, transmitting through a direct path includes not forwarding via a relay.

In one embodiment, the U2N relay UE is a UE providing the functionality of supporting connectivity to the network for the U2N remote UE.

In one subembodiment, the U2N relay UE is a UE.

In one subembodiment, the U2N relay UE provides the U2N remote UE with the service of relay to the network.

In one embodiment, the U2N remote UE is a UE in communication with the network via the U2N relay UE.

In one embodiment, a serving cell refers to a cell that the UE is camped on. Performing cell search includes that the UE searches for a suitable cell for a selected Public Land Mobile Network (PLMN) or Stand-alone Non-Public Network (SNPN), selects the suitable cell to provide available services, and monitors a control channel of the suitable cell, where the whole procedure is defined to be camped on the cell; in other words, relative to this UE, the cell being camped on is seen as a serving cell of the UE. Being camped on a cell in either RRC Idle state or RRC_Inactive state is advantageous in the following aspects: enabling the UE to receive system information from a PLMN or an SNPN; after registration, if a UE hopes to establish an RRC connection or resume a suspended RRC connection, the UE can perform an initial access on a control channel of the camped cell to achieve such purpose; the network can page the UE; so that the UE can receive notifications from the Earthquake and Tsunami Warning System (ETWS) and the Commercial Mobile Alert System (CMAS).

In one embodiment, for a UE in RRC_Connected state without being configured with carrier aggregation/dual connectivity (CA/DC), there is only one serving cell that comprises a primary cell. For a UE in RRC_Connected state that is configured with carrier aggregation/dual connectivity (CA/DC), a serving cell is used for indicating a cell set comprising a Special Cell (SpCell) and all secondary cells. A Primary Cell is a cell in a Master Cell Group (MCG), i.e., an MCG cell, working on the primary frequency, and the UE performs an initial connection establishment procedure or initiates a connection re-establishment on the Primary Cell. For dual connectivity (DC) operation, a special cell refers to a Primary Cell (PCell) in an MCG or a Primary SCG Cell (PSCell) in a Secondary Cell Group (SCG); otherwise, the special cell refers to a PCell.

In one embodiment, working frequency of a Secondary Cell (SCell) is secondary frequency.

In one embodiment, separate contents in information elements (IEs) are called fields.

In one embodiment, Multi-Radio Dual Connectivity (MR-DC) refers to dual connectivity with an E-UTRA node and an NR node, or with two NR nodes.

In one embodiment, in MR-DC, a radio access node providing a control plane connection to the core network is a master node, where the master node can be a master eNB, a master ng-eNB or a master gNB.

In one embodiment, an MCG refers to a group of serving cells associated with a master node in MR-DC, including a SpCell, and optionally, one or multiple SCells.

In one embodiment, a PCell is a SpCell of an MCG.

In one embodiment, a PSCell is a SpCell of an SCG.

In one embodiment, in MR-DC, a radio access node not providing a control plane connection to the core network but providing extra resources for the UE is a secondary node. The secondary node can be an en-gNB, a secondary ng-eNB or a secondary gNB.

In one embodiment, in MR-DC, a group of serving cells associated with a secondary node is a secondary cell group (SCG), including a SpCell and, optionally, one or multiple SCells.

In one embodiment, an Access Stratum (AS) functionality that enables Vehicle-to Everything (V2X) communications defined in 3GPP TS 23.285 is V2X sidelink communication, where the V2X sidelink communication occurs between nearby UEs, using E-UTRA techniques but not traversing network nodes.

In one embodiment, an Access Stratum (AS) functionality that at least enables Vehicle-to Everything (V2X) communications defined in 3GPP TS 23.287 is NR sidelink communication, where the NR sidelink communication occurs between two or more nearby UEs, using NR technology but not traversing network nodes.

In one embodiment, the sidelink supports UE-to-UE direct communications that uses sidelink resource allocation mode, a physical-layer signal or channel, and physical layer procedures.

In one embodiment, not being or not located within coverage is equivalent to being out of coverage.

In one embodiment, being within coverage is equivalent to being covered.

In one embodiment, being out of coverage is equivalent to being uncovered.

In one embodiment, the first node is a U2N remote node.

In one embodiment, PDCP entities corresponding to radio bearers (RBs) terminated between a UE and the network are respectively located within the UE and the network.

In one embodiment, the direct path refers to a direct path or communication link or channel or bearer used for the direct-link transmission.

In one embodiment, the direct-path transmission means that data borne by at least Signaling radio bearer (SRB) between the UE and network does not go through relaying or forwarding of other nodes.

In one embodiment, the direct-path transmission means that RLC bearers associated with at least Signaling radio bearer (SRB) between the UE and network are respectively terminated at the UE and the network.

In one embodiment, the direct-path transmission means that RLC entities associated with at least Signaling radio bearer (SRB) between the UE and network are respectively terminated at the UE and the network.

In one embodiment, the direct-path transmission means that there is a direct communication link between the UE and the network.

In one embodiment, the direct-path transmission means that there is a Uu interface between the UE and the network.

In one embodiment, the direct-path transmission means that there is a MAC layer of a Uu interface, and the MAC layer of the Uu interface carries an RRC signaling.

In one embodiment, the direct-path transmission means that there is a physical layer of a Uu interface between the UE and the network.

In one embodiment, the direct-path transmission means that there is a logical channel and/or a transport channel between the UE and the network.

In one embodiment, the indirect path refers to an indirect path or communication link or channel or bearer used for the indirect-path transmission.

In one embodiment, the indirect-path transmission means that data borne by at least Signaling radio bearer (SRB) between the UE and network goes through relaying or forwarding of other nodes.

In one embodiment, the indirect-path transmission means that RLC bearers associated with at least Signaling radio bearer (SRB) between the UE and network are respectively terminated at the UE and the other node, as well as the other node and the network.

In one embodiment, the indirect-path transmission means that RLC entities associated with at least Signaling radio bearer (SRB) between the UE and network are respectively terminated at the UE and the other node, as well as the other node and the network.

In one embodiment, the indirect-path transmission means that there is no direct communication link between the UE and the network.

In one embodiment, the indirect-path transmission means that there isn't a MAC layer of a Uu interface between the UE and the network.

In one embodiment, the indirect-path transmission means that there isn't a physical layer of a Uu interface between the UE and the network.

In one embodiment, the indirect-path transmission means that there is neither a logical channel nor a transport channel between the UE and the network.

In one embodiment, the network includes a Radio Access Network (RAN) and/or a serving cell and/or a base station.

In one embodiment, the phrase of at least SRB includes at least one of {SRB0, SRB1, SRB2, SRB3}.

In one embodiment, the phrase of at least SRB includes both an SRB and a data radio bearer (DRB).

In one embodiment, the UE in the phrase of the UE and the network includes the first node.

In one embodiment, the other nodes include a relay node or other UE.

In one embodiment, when using a direct path for transmission, the UE can transmit a physical layer signaling to the network; when using an indirect path for transmission, the UE cannot transmit or directly transmit a physical layer signaling to the network.

In one embodiment, when using a direct path for transmission, the UE can transmit a MAC CE to the network; when using an indirect path for transmission, the UE cannot transmit or directly transmit a MAC CE to the network.

In one embodiment, when using a direct path for transmission, there isn't any other protocol layer between a PDCP layer and an RLC layer of the first node; when using an indirect path for transmission, there is at least one other protocol layer between a PDCP layer and an RLC layer of the first node.

In one subembodiment, the other protocol layer is or includes an adaptation layer.

In one embodiment, when using a direct path for transmission, the network directly schedules uplink transmission of the first node via DCI; when using an indirect path for transmission, the network does not directly schedule uplink transmission of the first node via DCI.

In one embodiment, when using a direct path for transmission, an SRB of the first node is associated with an RLC entity and/or an RLC layer and/or an RLC bearer; when using an indirect path for transmission, an SRB of the first node is associated with an RLC entity of a PC5 interface.

In one embodiment, when using a direct path for transmission, a mapping relation exists between an SRB of the first node and an RLC entity of a Uu interface; when using an indirect path for transmission, a mapping relation exists between an SRB of the first node and an RLC entity of a PC5 interface.

In one embodiment, there only exists a direct path or an indirect path between the first node and the network.

In one embodiment, the phrase of switching from a direct path to an indirect path means: starting to use an indirect path and stopping using a direct path.

In one embodiment, the phrase of switching from a direct path to an indirect path means: starting to use an indirect path for transmission and stopping using a direct path for transmission.

In one embodiment, the phrase of switching from a direct path to an indirect path means: turning a direct-path transmission into an indirect-path transmission.

In one embodiment, the phrase of switching from a direct path to an indirect path means: the first node associates an SRB with an RLC entity of a PC5 interface and meanwhile releases an RLC entity of a Uu interface associated with the SRB.

In one embodiment, the phrase of switching from a direct path to an indirect path means: the first node associates an SRB and a DRB with an RLC entity of a PC5 interface and meanwhile releases an RLC entity of a Uu interface associated with the SRB and the DRB.

In one embodiment, the phrase of switching from a direct path to an indirect path means: an SRB and a DRB of the first node is associated with an RLC entity of a PC5 interface and no longer associated with an RLC entity or an RLC bearer of a Uu interface.

In one subembodiment, the meaning of the phrase of being no longer associated with an RLC entity of a Uu interface includes being disassociated.

In one subembodiment, the meaning of the phrase of being no longer associated with an RLC entity of a Uu interface includes that a radio bearer served by an RLC entity of the Uu interface includes neither an SRB nor a DRB.

In one subembodiment, the meaning of the phrase of being no longer associated with an RLC entity of a Uu interface includes releasing an RLC bearer or an RLC entity of the Uu interface.

In one subembodiment, at least one RLC bearer of a PC5 interface is added, and the at least one RLC bearer of the PC5 interface being added serves/serve an SRB and/or a DRB of the first node.

In one embodiment, the phrase of switching from a direct path to an indirect path means: an SRB and a DRB of the first node is associated with a sidelink RLC entity and no longer associated with an RLC entity or an RLC bearer of a Uu interface.

In one subembodiment, the meaning of the phrase of being no longer associated with an RLC entity of a Uu interface includes being disassociated.

In one subembodiment, the meaning of the phrase of being no longer associated with an RLC entity of a Uu interface includes that a radio bearer served by an RLC entity of the Uu interface includes neither an SRB nor a DRB.

In one subembodiment, the meaning of the phrase of being no longer associated with an RLC entity of a Uu interface includes releasing an RLC bearer or an RLC entity of the Uu interface.

In one subembodiment, at least one sidelink RLC bearer is added, and the at least one sidelink RLC bearer being added serves/serve an SRB and/or a DRB of the first node.

In one embodiment, the phrase of switching from a direct path to an indirect path means: at least one radio bearer of the first node is associated with a second RLC entity, and the at least one radio bearer of the first node is not associated with a first RLC entity.

In one subembodiment, the second RLC entity is a sidelink RLC entity.

In one subembodiment, the second RLC entity is an RLC entity of a PC5 interface.

In one subembodiment, the first RLC entity is an RLC entity of a Uu interface.

In one subembodiment, the first RLC entity is an RLC entity.

In one subembodiment, the RLC entity is configured by an RLC-BearerConfig.

In one subembodiment, the RLC entity is configured by an RLC-config in an RLC-BearerConfig.

In one subembodiment, the meaning of the phrase of being not associated with a first RLC entity is being no longer associated with the first RLC entity.

In one subembodiment, the meaning of the phrase of being not associated with a first RLC entity includes being no longer associated with the first RLC entity.

In one subembodiment, the meaning of the phrase of being not associated with a first RLC entity includes being disassociated.

In one subembodiment, the meaning of the phrase of being not associated with a first RLC entity includes being relieved from a mapping relationship.

In one subembodiment, the meaning of the phrase of being not associated with a first RLC entity includes that radio bearer(s) served by an RLC bearer corresponding to the first RLC entity does/do not include the at least one radio bearer of the first node.

In one subembodiment, the meaning of the phrase of being not associated with a first RLC entity includes releasing the first RLC entity that serves the at least one radio bearer of the first node.

In one subembodiment, the meaning of the phrase of being not associated with a first RLC entity includes releasing an RLC bearer corresponding to the first RLC entity that serves the at least one radio bearer of the first node.

In one subembodiment, the meaning of the phrase of being not associated with a first RLC entity includes releasing all RLC bearers and/or RLC entities of a Uu interface.

In one subembodiment, the phrase of being associated with a second RLC entity means: adding at least one sidelink RLC bearer, and the at least one sidelink RLC bearer being added serving the at least one radio bearer of the first node.

In one subembodiment, the phrase of being associated with a second RLC entity means: configuring at least one sidelink RLC bearer for serving the at least one radio bearer of the first node.

In one subembodiment, the at least one radio bearer of the first node is an SRB.

In one subembodiment, the at least one radio bearer of the first node is a DRB.

In one subembodiment, the at least one radio bearer of the first node is any SRB other than an SRB0.

In one subembodiment, the at least one radio bearer of the first node is any RB.

In one subembodiment, the at least one radio bearer of the first node includes any RB.

In one subembodiment, the at least one radio bearer of the first node is or includes any SRB.

In one subembodiment, the at least one radio bearer of the first node is or includes any DRB.

In one embodiment, the phrase of switching from a direct path to an indirect path means: at least one radio bearer of the first node is associated with a second RLC bearer, and the at least one radio bearer of the first node is not associated with a first RLC bearer.

In one subembodiment, the second RLC Bearer is a sidelink RLC bearer.

In one subembodiment, the second RLC Bearer is an RLC bearer of a PC5 interface.

In one subembodiment, the first RLC Bearer is an RLC bearer of a Uu interface.

In one subembodiment, the first RLC Bearer is an RLC bearer.

In one subembodiment, the RLC bearer is configured by an RLC-BearerConfig.

In one subembodiment, the RLC bearer is configured by an RLC-config in an RLC-BearerConfig.

In one subembodiment, the sidelink RLC bearer is configured by an RRC IE other than an RLC-BearerConfig.

In one subembodiment, the sidelink RLC bearer is configured by an RRC IE other than an RLC-config in an RLC-BearerConfig.

In one subembodiment, the sidelink RLC bearer is configured by a s1-RLC-BearerConfig.

In one subembodiment, the sidelink RLC bearer is configured by an RLC-config in a s1-RLC-BearerConfig.

In one subembodiment, the meaning of the phrase of being not associated with a first RLC bearer is being no longer associated with the first RLC bearer.

In one subembodiment, the meaning of the phrase of being not associated with a first RLC bearer includes being no longer associated with the first RLC bearer.

In one subembodiment, the meaning of the phrase of being not associated with a first RLC bearer includes being disassociated.

In one subembodiment, the meaning of the phrase of being not associated with a first RLC bearer includes being relieved from a mapping relationship.

In one subembodiment, the meaning of the phrase of being not associated with a first RLC bearer includes that radio bearer(s) served by the first RLC bearer does/do not include the at least one radio bearer of the first node.

In one subembodiment, the meaning of the phrase of being not associated with a first RLC bearer includes releasing the first RLC bearer that serves the at least one radio bearer of the first node.

In one subembodiment, the meaning of the phrase of being not associated with a first RLC bearer includes releasing the first RLC bearer that serves the at least one radio bearer of the first node.

In one subembodiment, the meaning of the phrase of being not associated with a first RLC bearer includes releasing the first RLC bearer.

In one subembodiment, before receiving the first message, the at least one radio bearer of the first node is served by the first RLC bearer.

In one subembodiment, the meaning of the phrase of being not associated with a first RLC bearer includes releasing all RLC bearers and/or RLC entities of a Uu interface.

In one subembodiment, the phrase of being associated with a second RLC bearer means: adding at least one sidelink RLC bearer, and the at least one sidelink RLC bearer being added serving the at least one radio bearer of the first node.

In one subembodiment, the phrase of being associated with a second RLC bearer means: configuring at least one sidelink RLC bearer for serving the at least one radio bearer of the first node.

In one subembodiment, the at least one radio bearer of the first node is an SRB.

In one subembodiment, the at least one radio bearer of the first node is a DRB.

In one subembodiment, the at least one radio bearer of the first node is any SRB other than an SRB0.

In one subembodiment, the at least one radio bearer of the first node is any RB.

In one subembodiment, the at least one radio bearer of the first node includes any RB.

In one subembodiment, the at least one radio bearer of the first node is or includes any SRB.

In one subembodiment, the at least one radio bearer of the first node is or includes any DRB.

In one subembodiment, a rlc-BearerToReleaseList of the first message comprises an identity of the first RLC bearer.

In one subembodiment, the meaning of the phrase of being not associated with a first RLC bearer is that a rlc-BearerToReleaseList of the first message comprises an identity of the first RLC bearer.

In one subembodiment, the phrase of being associated with a second RLC bearer means that: a s1-rlc-BearerToReleaseList comprised by the first message configures the second RLC bearer to serve the at least one radio bearer of the first node.

In one subembodiment, the phrase of being associated with a second RLC bearer means that: a PC5-related RLC-BearerToAddModList comprised by the first message configures the second RLC bearer to serve the at least one radio bearer of the first node.

In one subembodiment, the phrase of being associated with a second RLC bearer means that: a relay-related RLC-BearerToAddModList comprised by the first message configures the second RLC bearer to serve the at least one radio bearer of the first node.

In one subembodiment, the phrase of being associated with a second RLC bearer means that: a sidelink-related RLC-BearerToAddModList comprised by the first message configures the second RLC bearer to serve the at least one radio bearer of the first node.

In one embodiment, the first message comprises a rlc-BearerToReleaseList.

In one embodiment, the first message comprises a rlc-BearerToReleaseList.

In one embodiment, the first message comprises a s1-RLC-BearerToAddModList.

In one embodiment, the first message comprises a PC5-related RLC-BearerToAddModList.

In one subembodiment, the phrase that the first message comprises a PC5-related RLC-BearerToAddModList means that: the first message comprises one Information Element (IE) of which the name includes not only PC5 but also BearerToAddModList.

In one embodiment, the first message comprises a relay-related RLC-BearerToAddModList.

In one subembodiment, the phrase that the first message comprises a relay-related RLC-BearerToAddModList means that: the first message comprises one Information Element (IE) of which the name includes not only relay but also BearerToAddModList.

In one subembodiment, the phrase that the first message comprises a relay-related RLC-BearerToAddModList means that: the first message comprises one Information Element (IE) of which the name includes BearerToAddModList, and the IE of which the name includes BearerToAddModList indicates being related to relay.

In one embodiment, the first message comprises a sidelink-related RLC-BearerToAddModList.

In one embodiment, the first message is or comprises a RRCReconfiguration.

In one embodiment, the first message is or comprises a RRCConnectionReconfiguration.

In one embodiment, the first message comprises a CellGroupConfig.

In one embodiment, the first message comprises an RLC-config.

In one embodiment, the first message comprises a s1-RLC-config.

In one embodiment, the first message comprises a relay-RLC-config.

In one embodiment, the first message comprises an RLC-config-relay.

In one embodiment, the first message indicates a release of an RLC bearer associated with a direct path.

In one embodiment, the first message indicates a release of at least one logical channel.

In one embodiment, the first message indicates a release of at least one LogicalChannelIdentity via a rlc-BearerToReleaseList.

In one embodiment, the first message indicates that at least one RLC bearer related to an indirect path is to be added.

In one embodiment, the first message indicates that at least one sidelink RLC bearer or PC5-interface RLC bearer related to an indirect path is to be added.

In one embodiment, the first message at least indicates that an RLC bearer associated with SRB is modified as a sidelink RLC bearer or an RLC bearer of a PC5 interface.

In one embodiment, the first message at least indicates that an SRB is no longer associated with an RLC bearer, but instead with a sidelink RLC bearer or an RLC bearer of a PC5 interface.

In one embodiment, the first message at least indicates that an SRB is no longer associated with an RLC bearer, but instead with a sidelink RLC bearer or an RLC bearer of a PC5 interface.

In one embodiment, the first message indicates that: All SRBs are no longer associated with an RLC bearer, but instead are associated with an RLC bearer or relay RLC bearer related to an indirect path.

In one subembodiment, the RLC bearer refers to an RLC bearer of a Uu interface.

In one embodiment, the first message indicates that: All DRBs are no longer associated with an RLC bearer, but instead are associated with an RLC bearer or relay RLC bearer related to an indirect path.

In one subembodiment, the RLC bearer refers to an RLC bearer of a Uu interface.

In one embodiment, the first message indicates that: All SRBs are no longer associated with an RLC bearer, but instead are associated with an RLC bearer or relay RLC bearer related to an indirect path.

In one embodiment, the first message indicates that: All DRBs are no longer associated with an RLC bearer, but instead are associated with an RLC bearer or relay RLC bearer related to an indirect path.

In one embodiment, the first message comprises reconfigurationWithSync.

In one embodiment, the first timer is not T304.

In one embodiment, the first timer is not T310.

In one embodiment, the first timer is not T311.

In one embodiment, the first timer is not T312.

In one embodiment, the first timer is not T316.

In one embodiment, the first timer is T303.

In one embodiment, the first timer is T305.

In one embodiment, the first timer is T314.

In one embodiment, the first timer is T324.

In one embodiment, the first timer is T334.

In one embodiment, the first timer is T344.

In one embodiment, the first timer is T304*a*.

In one embodiment, the first timer is T304*b*.

In one embodiment, the first timer is T304*r*.

In one embodiment, the first timer is T304-*r*.

In one embodiment, the first timer is T401.

In one embodiment, the first timer is T402.

In one embodiment, the first timer is T403.

In one embodiment, the first timer is T404.

In one embodiment, the first timer is T414.

In one embodiment, the first timer is T411.

In one embodiment, the first timer is T410.

In one embodiment, the first timer is T500.

In one embodiment, the first timer is T501.

In one embodiment, the first timer is T502.

In one embodiment, the first timer is T503.

In one embodiment, the first timer is T504.

In one embodiment, the first timer is T514.

In one embodiment, a name of the first timer includes relay.

In one embodiment, a name of the first timer includes r.

In one embodiment, a name of the first timer includes T1.

In one embodiment, a name of the first timer includes T2.

In one embodiment, a name of the first timer includes 304.

In one embodiment, the first timer is not T304.

In one embodiment, the first timer being expired triggers the first node's performance of RRC Re-establishment.

In one embodiment, an expiration of the first timer is assumed to be a failure.

In one embodiment, the first timer being expired triggers the first node's initiation of a re-establishment of RRC connection.

In one embodiment, the first node is in RRC_Connected state.

In one embodiment, the action of starting the first timer comprises restarting the first timer.

In one embodiment, a period of time after the action of starting a first timer and before the first timer expires refers to the time while the first timer is in a running state.

In one embodiment, reception of the first signal triggers the first node's stopping of the first timer.

In one embodiment, the sidelink is a communication link between the first node and other UE.

In one embodiment, the sidelink is a communication link between the first node and a relay.

In one embodiment, a physical channel occupied by the first signal is a Physical Sidelink Shared Channel (PSSCH).

In one embodiment, a physical channel occupied by the first signal is a Physical Sidelink Control Channel (PSCCH).

In one embodiment, a physical channel occupied by the first signal is a Physical Sidelink Feedback Channel (PSFCH).

In one embodiment, the first signal is received after the second message is transmitted.

In one embodiment, a reception of the first signal is later than a transmission of the second message.

In one embodiment, the second message triggers the first signal.

In one embodiment, the first signal is an ACK.

In one embodiment, the first signal comprises an ACK.

In one embodiment, the first signal comprises Sidelink Control Information (SCI).

In one embodiment, the first signal is an SCI.

In one embodiment, the first signal comprises a MAC CE.

In one embodiment, the first signal is a MAC CE.

In one embodiment, the first signal comprises a MAC CE and an SCI.

In one embodiment, the first signal is a MAC CE and an SCI.

In one embodiment, the first signal comprises a PC5-RRC message.

In one embodiment, the first signal is a PC5-RRC message.

In one embodiment, a bearer occupied by the first signal is a sidelink bearer.

In one embodiment, the second message occupies sidelink resources; the first message does not occupy sidelink resources.

In one embodiment, the second message comprises an RRC signaling.

In one embodiment, the second message is RRCReconfigurationComplete.

In one embodiment, the second message is RRCConnectionReconfigurationComplete.

In one embodiment, the second message and the first message appear in pairs.

In one embodiment, the second message indicates that at least partial configurations in the first message have been applied.

In one embodiment, the first message being transmitted via the direct path means that a physical channel occupied by the first message includes or only includes a PDSCH; the second message being transmitted via the indirect path means that a physical channel occupied by the second message includes or only includes at least one of {PSSCH, PSCCH, PSFCH}.

In one embodiment, the first message being transmitted via the direct path means that a physical channel occupied by the first message does not include any one of {PSSCH, PSCCH, PSFCH}.

In one embodiment, the action of receiving via sidelink means: receiving on resources in the sidelink.

In one embodiment, the action of receiving via sidelink means: receiving on a channel in the sidelink.

In one subembodiment, the channel in the sidelink includes at least one of {PSSCH, PSCCH, PSFCH}.

In one embodiment, a transmitter of the first signal is a relay of the first node.

In one embodiment, a transmitter of the first signal is a U2N relay of the first node.

In one embodiment, a transmitter of the first signal is a relay comprised by the indirect path.

In one embodiment, a transmitter of the first signal is a relay between the first node and the network.

In one embodiment, the meaning of the second message being transmitted via an indirect path includes that the second message is forwarded by a transmitter of the first signal.

In one embodiment, the first signal comprises a packet generated by a transmitter of any said first message; or, the first signal comprises a packet generated by a transmitter of a first said first message.

In one subembodiment, a transmitter of the first message is a serving cell of the first node.

In one subembodiment, a transmitter of the first message is a base station.

In one subembodiment, a transmitter of the first message does not include a relay.

In one subembodiment, a transmitter of the first message is a generator of the first message.

In one subembodiment, a transmitter of the first message does not include other UE.

In one subembodiment, the packet generated by the transmitter of any said first message is or comprises a PDCP PDU.

In one subembodiment, the packet generated by the transmitter of any said first message is or comprises a PDCP SDU.

In one subembodiment, the packet generated by the transmitter of any said first message is or comprises an IP packet.

In one subembodiment, the packet generated by the transmitter of any said first message is or comprises an RRC message.

In one subembodiment, the packet generated by the transmitter of any said first message is or comprises a NAS message.

In one subembodiment, the packet generated by the transmitter of any said first message uses an SRB and/or DRB of the first node.

In one subembodiment, the packet generated by the transmitter of any said first message is or comprises a system message.

In one embodiment, the first signal comprises a first signaling, the first signaling for indicating that the indirect path has been established.

In one subembodiment, the first signaling indicates that a transmitter of the first signal has established an RRC connection, and that the transmitter of the first signal has established the RRC connection is used for acknowledging that the indirect path has been established.

In one subembodiment, the first signaling is a PC5-S message.

In one subembodiment, the first signaling is a PC5-RRC message.

In one subembodiment, the first signaling is a discovery message.

In one subembodiment, the first signaling indicates that data from the first node had already been forwarded successfully to the network.

In one subembodiment, the first signaling is a PDCP status report.

In one subembodiment, the first signaling is an adaptation layer signaling.

In one subembodiment, the first signaling is a MAC CE.

In one subembodiment, the first signaling is transmitted through a PSCCH.

In one subembodiment, the first signaling indicates that the first node can be in communication with the network via the indirect path.

In one subembodiment, the first signaling explicitly indicates that the indirect path has been established.

In one subembodiment, the first signaling indicates that an acknowledgement that an indirect path has been established has been received from the network.

In one subembodiment, the first signaling indicates that an ACK sent by an RLC entity at the network side corresponding to an RLC bearer for forwarding data of the first node is received.

In one subembodiment, the first signaling indicates that an RLC status report sent by an RLC entity at the network side corresponding to an RLC bearer for forwarding data of the first node is received.

In one subembodiment, the first signaling indicates that a receiving or transmitting window of an RLC entity at a Uu interface of the transmitter of the first signal corresponding to an RLC bearer for forwarding data of the first node has moved.

In one subembodiment, the first signaling indicates that an RLC bearer at a Uu interface for forwarding data of the first node has been established.

In one subembodiment, the first signaling is a RRCReconfigurationSidelink.

In one subembodiment, the first signaling is a RRCReconfigurationCompleteSidelink.

In one subembodiment, the first signaling is a SCCH-Message.

In one subembodiment, a generator of the first signaling is a transmitter of the first signal.

In one subembodiment, a generator for the first signaling is a relay of the first node.

In one subembodiment, a reception of the first signaling can acknowledge that the first node can use the indirect path for communication with the network.

In one embodiment, the first signal comprises a second signaling, the second signaling for acknowledging that a direct link between the first node and a transmitter of the first signal has been successfully established; the second signaling comprises a relay service code; the second signaling is a PC5-S message.

In one subembodiment, the second signaling indicates that a PC5 unicast link establishment is completed.

In one subembodiment, the second signaling indicates that a PC5 unicast link modification is completed.

In one subembodiment, the second signaling indicates an acceptance of the establishment of a direct link.

In one subembodiment, the second signaling indicates that a direct link establishment has been completed.

In one subembodiment, the second signaling indicates that a direct link authentication has been completed.

In one subembodiment, the second signaling is a Direct link establishment accept.

In one subembodiment, the second signaling is a Direct link modification accept.

In one subembodiment, the second signaling is a Direct link authentication response.

In one subembodiment, the relay service code is also called RSC.

In one subembodiment, the relay service code (RSC) is used for 5G ProSe UE-to-Network (U2N) relay discovery, and for indicating the service of connection provided by the 5G ProSe U2N relay; the 5G ProSe U2N relay and 5G ProSe U2N remote UE can determine from the RSC whether to support a L2 or a L3 relay.

In one embodiment, the first node transmits a second signal on the sidelink; the second signal comprises a third signaling, the second signaling for acknowledging that a direct link between the first node and a transmitter of the first signal has been successfully established; the second signaling comprises a relay service code; the third signaling is a PC5-S message; as a response to transmitting the second signal, the first node stops the first timer.

In one subembodiment, the third signal occupies a PSSCH.

In one subembodiment, the third signal occupies a PSCCH.

In one subembodiment, the third signaling indicates that a PC5 unicast link establishment is completed.

In one subembodiment, the third signaling indicates that a PC5 unicast link modification is completed.

In one subembodiment, the third signaling indicates an acceptance of the establishment of a direct link.

In one subembodiment, the third signaling indicates that a direct link establishment has been completed.

In one subembodiment, the third signaling indicates that a direct link authentication has been completed.

In one subembodiment, the third signaling is a Direct link establishment accept.

In one subembodiment, the third signaling is a Direct link modification accept.

In one subembodiment, the third signaling is a Direct link authentication response.

In one subembodiment, the relay service code is also called RSC.

In one subembodiment, the relay service code (RSC) is used for 5G ProSe UE-to-Network (U2N) relay discovery, and for indicating the service of connection provided by the 5G ProSe U2N relay; the 5G ProSe U2N relay and 5G ProSe U2N remote UE can determine from the RSC whether to support a L2 or a L3 relay.

Embodiment 2

Figure 2:
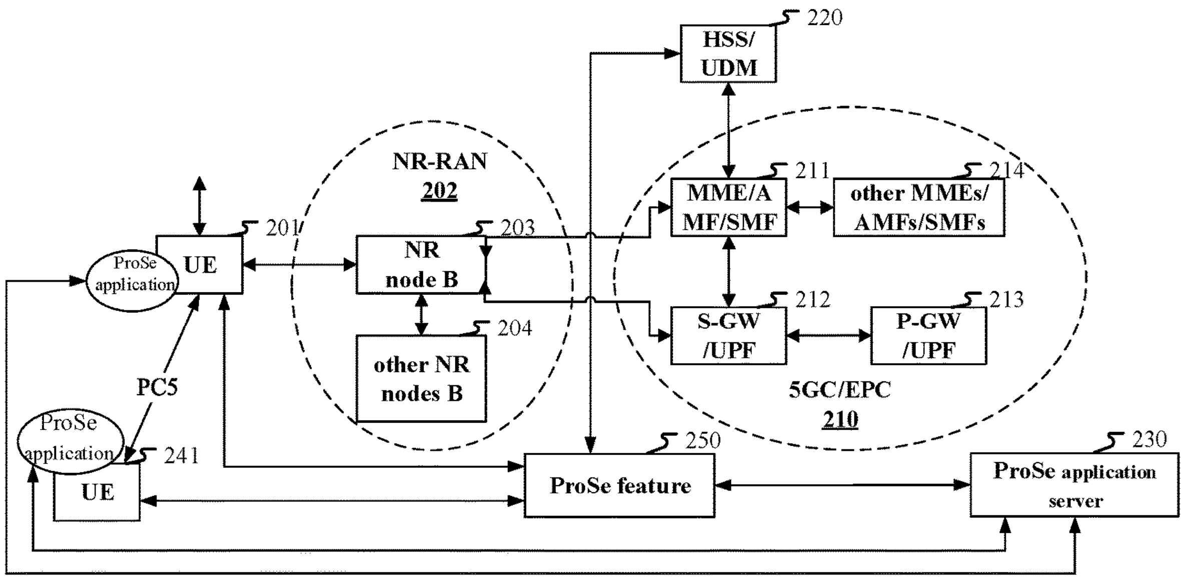
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE241, an NG-RAN 202, a 5G-Core Network/Evolved Packet Core (5GC/EPC) 210, a Home Subscriber Server/Unified Data Management (HSS/UDM) 220, a ProSe feature 250 and ProSe application server 230. The V2X communication architecture may be interconnected with other access networks. For simple description, the entities/interfaces are not shown. As shown in FIG. 2, the V2X communication architecture provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Data Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services. The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE201 and the UE241 are connected by a PC5 Reference Point.

In one embodiment, the ProSe feature 250 is connected to the UE 201 and the UE 241 respectively by PC3 Reference Points.

In one embodiment, the ProSe feature 250 is connected to the ProSe application server 230 by a PC2 Reference Point.

In one embodiment, the ProSe application server 230 is connected with the ProSe application of the UE 201 and the ProSe application of the UE 241 respectively via a PC1 Reference Point.

In one embodiment, the first node in the present application is the UE 201.

In one embodiment, the second node in the present application is the gNB203.

In one embodiment, the third node in the present application is the UE 241.

In one embodiment, a radio link between the UE 201 and the UE 241 corresponds to a sidelink (SL) in the present application.

In one embodiment, a radio link from the UE 201 to the NR Node B is an uplink.

In one embodiment, a radio link from the NR Node B to the UE 201 is a downlink.

In one embodiment, a radio link from the UE 241 to the NR Node B is an uplink.

In one embodiment, a radio link from the NR Node B to the UE 241 is a downlink.

In one embodiment, the UE 201 supports relay transmission.

In one embodiment, the UE 241 supports relay transmission.

In one embodiment, the UE 201 is a means of transportation including automobile.

In one embodiment, the UE 241 is a means of transportation including automobile.

In one embodiment, the gNB 203 is a MacroCellular base station.

In one embodiment, the gNB203 is a Micro Cell base station.

In one embodiment, the gNB 203 is a PicoCell base station.

In one embodiment, the gNB203 is a flight platform.

In one embodiment, the gNB203 is satellite equipment.

Embodiment 3

Figure 3:
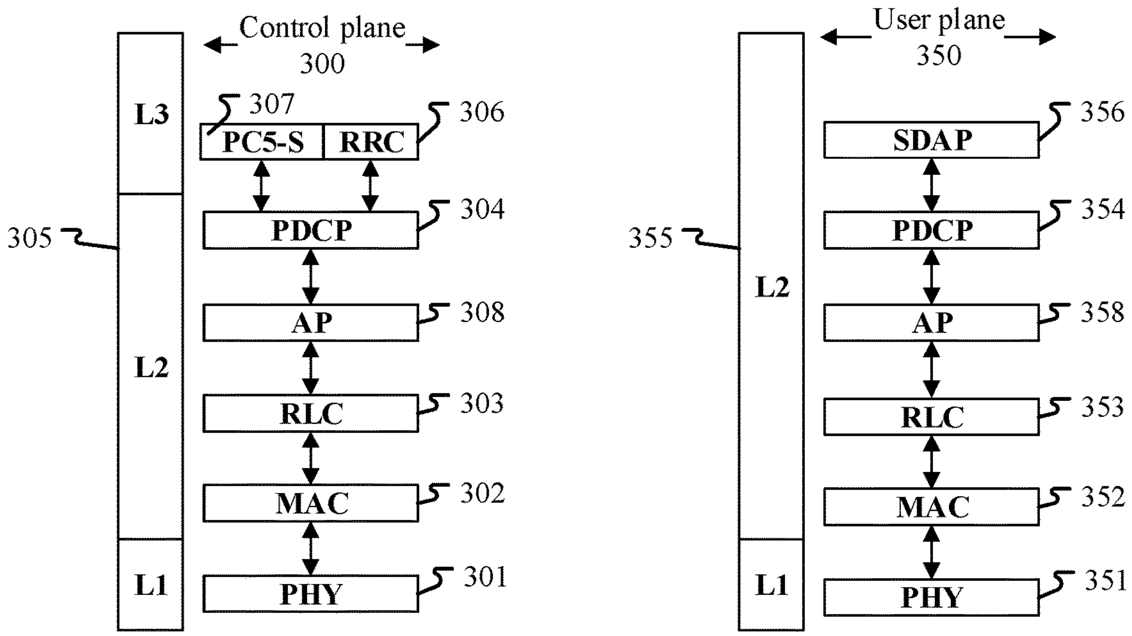
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, satellite or aircraft in NTN) and a second node (gNB, UE, or satellite or aircraft in NTN), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The PC5 Signaling Protocol (PC5-S) sublayer 307 is responsible for processing the signaling protocol at the PC5 interface. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355. Besides, the first node comprises a network layer (i.e., IP layer) terminated at a P-GW 213 of the network side and an application layer terminated at the other side of the connection (i.e., a peer UE, a server, etc.). For a UE involved with relay services, its control plane can also comprise an adaptation sublayer AP308, and its user plane can also comprise an adaptation sublayer AP358. The introduction of the adaptation layer is beneficial for lower layers such as the MAC or the RLC layer to multiple and/or distinguish data from multiple source UEs. For UE-UE communications relating to relay services, the adaptation sublayer can be excluded. Besides, adaptation sublayers AP308 and AP358 can respectively serve as sublayers of the PDCP304 and PDCP354. The RRC306 can be used for processing an RRC signaling of the Uu interface and a signaling of the PC5 interface.

In one embodiment, the radio protocol architecture in FIG. 3 is applicable to the first node in the present application.

In one embodiment, the radio protocol architecture in FIG. 3 is applicable to the second node in the present application.

In one embodiment, the radio protocol architecture in FIG. 3 is applicable to the third node in the present application.

In one embodiment, the first message in the present application is generated by the RRC306.

In one embodiment, the second message in the present application is generated by the RRC306.

In one embodiment, the third message in the present application is generated by the RRC306.

In one embodiment, the first signal in the present application is generated by the PHY301, or the MAC302, or the RLC303, or the RRC306 or the PC5-S307.

In one embodiment, the second signal in the present application is generated by the PHY301, or the MAC302, or the RLC303, or the RRC306 or the PC5-S307.

In one embodiment, the first signaling in the present application is generated by the PHY301, or the MAC302, or the RLC303, or the RRC306 or the PC5-S307.

In one embodiment, the second signaling in the present application is generated by the PC5-S307.

In one embodiment, the third signaling in the present application is generated by the PC5-S307.

In one embodiment, the first discovery message in the present application is generated by the PHY301, or the MAC302, or the RLC303, or the RRC306 or the PC5-S307.

Embodiment 4

Figure 4:
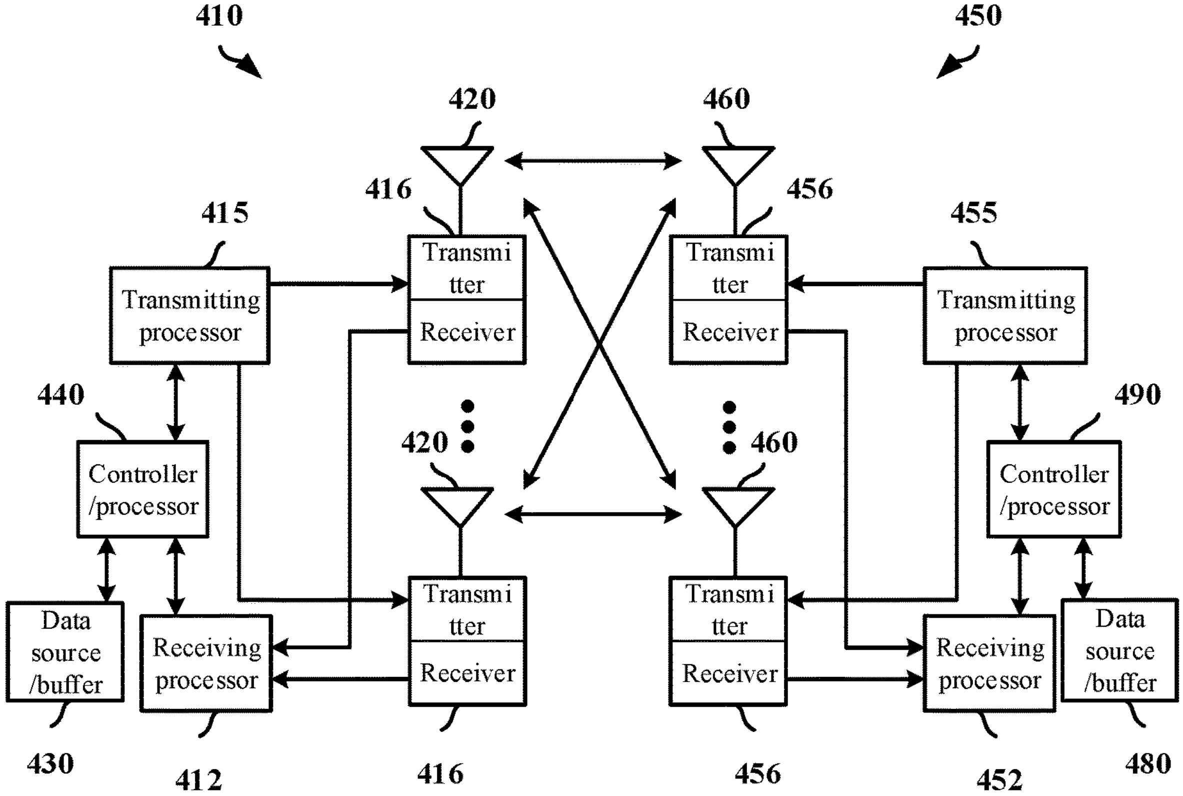
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 firstly converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The second communication device 450 at least: receives a first message, the first message indicating a switch from a direct path to an indirect path; and starts a first timer; an expiration of the first timer triggering an RRC re-establishment; receives a first signal on a sidelink after the action of starting a first timer and before the expiration of the first timer; and stops the first timer as a response to receiving the first signal; and transmits a second message, the second message used for feedback of the first message; herein, the first message is transmitted via the direct path; the second message is transmitted via the indirect path; the first message and the second message are RRC messages, respectively; the second message is relayed by a transmitter of the first signal; the first message is used for the action of starting the first timer.

In one embodiment, the first communication node 450 comprises a memory that stores a computer readable instruction program, the computer readable instruction program generates actions when executed by at least one processor, which include: receiving a first message, the first message indicating a switch from a direct path to an indirect path; and starting a first timer; an expiration of the first timer triggering an RRC re-establishment; receiving a first signal on a sidelink after the action of starting a first timer and before the expiration of the first timer; and stopping the first timer as a response to receiving the first signal; and transmitting a second message, the second message used for feedback of the first message; herein, the first message is transmitted via the direct path; the second message is transmitted via the indirect path; the first message and the second message are RRC messages, respectively; the second message is relayed by a transmitter of the first signal; the first message is used for the action of starting the first timer.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits a first message, the first message indicating a switch from a direct path to an indirect path; and receives a second message, the second message used for feedback of the first message; herein, a transmitter of the second message starts a first timer, where an expiration of the first timer triggers an RRC re-establishment, and receives a first signal on a sidelink after the action of starting a first timer and before the expiration of the first timer; the first signal is used for stopping the first timer; the first message is transmitted via the direct path; the second message is transmitted via the indirect path; the first message and the second message are RRC messages, respectively; the second message is relayed by a transmitter of the first signal; the first message is used for the action of starting the first timer.

In one embodiment, the second communication device 410 comprises a memory that stores a computer readable instruction program, the computer readable instruction program generates actions when executed by at least one processor, which include: transmitting a first message, the first message indicating a switch from a direct path to an indirect path; and receiving a second message, the second message used for feedback of the first message; herein, a transmitter of the second message starts a first timer, where an expiration of the first timer triggers an RRC re-establishment, and receives a first signal on a sidelink after the action of starting a first timer and before the expiration of the first timer; the first signal is used for stopping the first timer; the first message is transmitted via the direct path; the second message is transmitted via the indirect path; the first message and the second message are RRC messages, respectively; the second message is relayed by a transmitter of the first signal; the first message is used for the action of starting the first timer.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: forwards a second message, the second message used for feedback of the first message; transmits a first signal on a sidelink after the action of starting a first timer and before the expiration of the first timer; herein, a transmitter of the second message starts a first timer, where an expiration of the first timer is used for triggering an RRC re-establishment; the first signal is used for stopping the first timer; the first message indicating a switch from a direct path to an indirect path; the first message is transmitted via the direct path; the second message is transmitted via the indirect path; the first message and the second message are RRC messages, respectively; the first message is used for the action of starting the first timer.

In one embodiment, the first communication node 450 comprises a memory that stores a computer readable instruction program, the computer readable instruction program generates actions when executed by at least one processor, which include: forwarding a second message, the second message used for feedback of the first message; transmitting a first signal on a sidelink after the action of starting a first timer and before the expiration of the first timer; herein, a transmitter of the second message starts a first timer, where an expiration of the first timer is used for triggering an RRC re-establishment; the first signal is used for stopping the first timer; the first message indicating a switch from a direct path to an indirect path; the first message is transmitted via the direct path; the second message is transmitted via the indirect path; the first message and the second message are RRC messages, respectively; the first message is used for the action of starting the first timer.

In one embodiment, the first communication device 450 corresponds to the first node in the present application.

In one embodiment, the second communication device 410 corresponds to a second node in the present application.

In one embodiment, the first communication device 450 corresponds to the third node in the present application.

In one embodiment, the first communication device 450 is a UE.

In one embodiment, the first communication device 450 is a vehicle-mounted terminal.

In one embodiment, the first communication device 450 is a relay.

In one embodiment, the second communication device 410 is a base station.

In one embodiment, the receiver 456 (comprising the antenna 460), the receiving processor 452 and the controller/processor 490 are used for receiving the first message in the present application.

In one embodiment, the receiver 456 (comprising the antenna 460), the receiving processor 452 and the controller/processor 490 are used for receiving the first signal in the present application.

In one embodiment, the receiver 456 (comprising the antenna 460), the receiving processor 452 and the controller/processor 490 are used for receiving the second signal in the present application.

In one embodiment, the receiver 456 (comprising the antenna 460), the receiving processor 452 and the controller/processor 490 are used for receiving the first discovery message in the present application.

In one embodiment, the transmitter 456 (comprising the antenna 460), the transmitting processor 455 and the controller/processor 490 are used for transmitting the second message in the present application.

In one embodiment, the transmitter 456 (comprising the antenna 460), the transmitting processor 455 and the controller/processor 490 are used for transmitting the third message in the present application.

In one embodiment, the transmitter 416 (comprising the antenna 420), the transmitting processor 412 and the controller/processor 440 are used for transmitting the first message in the present application.

In one embodiment, the receiver 416 (comprising the antenna 420), the receiving processor 412 and the controller/processor 440 are used for receiving the second message in the present application.

In one embodiment, the receiver 416 (comprising the antenna 420), the receiving processor 412 and the controller/processor 440 are used for receiving the third message in the present application.

In one embodiment, the receiver 456 (comprising the antenna 460), the receiving processor 452 and the controller/processor 490 are used for receiving the first message in the present application.

In one embodiment, the receiver 456 (comprising the antenna 460), the receiving processor 452 and the controller/processor 490 are used for receiving the second message in the present application.

In one embodiment, the transmitter 456 (comprising the antenna 460), the transmitting processor 455 and the controller/processor 490 are used for transmitting the first message in the present application.

In one embodiment, the transmitter 456 (comprising the antenna 460), the transmitting processor 455 and the controller/processor 490 are used for transmitting the second message in the present application.

In one embodiment, the transmitter 456 (comprising the antenna 460), the transmitting processor 455 and the controller/processor 490 are used for transmitting the first signal in the present application.

In one embodiment, the transmitter 456 (comprising the antenna 460), the transmitting processor 455 and the controller/processor 490 are used for transmitting the second signal in the present application.

In one embodiment, the transmitter 456 (comprising the antenna 460), the transmitting processor 455 and the controller/processor 490 are used for transmitting the first discovery message in the present application.

Embodiment 5

Figure 5:
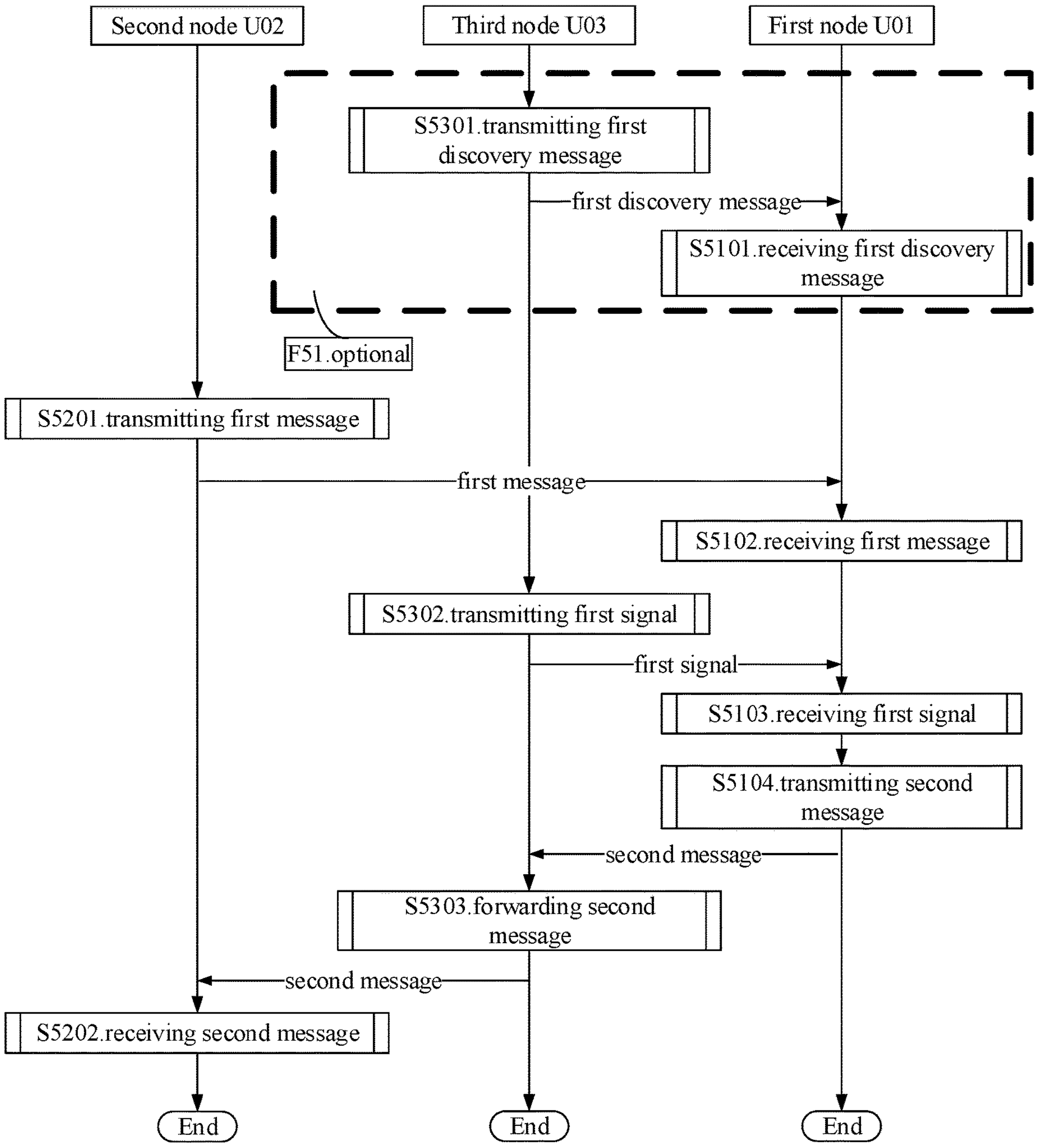
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, U01 corresponds to a first node in the present application, U02 corresponds to a second node in the present application, and a third node U03 corresponds to the third node in the present application. It should be particularly noted that the order presented in this embodiment does not limit the order of signal transmissions or the order of implementations of the present application; herein, steps marked by the F51 are optional.

The first node U01 receives a first discovery message in step S5101; receives a first message in step S5102; and receives a first signal in step S5103; and transmits a second message in step S5104.

The second node U02 transmits a first message in step S5201; and receives a second message in step S5202.

The third node U03 transmits a first discovery message in step S5301; and transmits a first signal in step S5302; and forwards a second message in step S5303.

In Embodiment 5, the first message indicates a switch from a direct path to an indirect path; the first node U01 starts a first timer; an expiration of the first timer triggering an RRC re-establishment; the first node U01 receives a first signal on a sidelink after the action of starting a first timer and before the expiration of the first timer; and stops the first timer as a response to receiving the first signal; the second message is used for feedback of the first message; the first message is transmitted via the direct path; the second message is transmitted via the indirect path; the first message and the second message are RRC messages, respectively; the second message is relayed by a transmitter of the first signal; the first message is used for the action of starting the first timer.

In one embodiment, the first node U01 is a U2N relay UE.

In one embodiment, the first node U01 is a U2N remote UE.

In one embodiment, the first node U01 is an NR ProSe U2N remote UE.

In one embodiment, the third node U03 is a UE.

In one embodiment, the third node U03 is a U2N relay of the first node U01.

In one embodiment, the third node U03 is a L2 relay of the first node U01.

In one embodiment, the third node U03 is an NR ProSe U2N relay.

In one embodiment, the second node U02 is a serving cell of the first node U01.

In one embodiment, the second node U02 is a primary cell (PCell) of the first node U01.

In one embodiment, the second node U02 is a Master Cell Group (MCG) of the first node U01.

In one embodiment, the second node U02 is a base station to which a PCell of the first node U01 corresponds or belongs.

In one embodiment, the second node U02 is a base station to which a PCell of the second node U02 corresponds or belongs.

In one embodiment, the second node U02 is not a serving cell of the first node U01.

In one embodiment, the second node U02 is a serving cell of the third node U03.

In one embodiment, the second node U02 is a primary cell (PCell) of the third node U03.

In one embodiment, the second node U02 is a Master Cell Group (MCG) of the third node U03.

In one embodiment, the second node U02 is a base station to which a PCell of the third node U03 corresponds or belongs.

In one embodiment, the first node U01 and the third node U03 share a same PCell.

In one embodiment, a camping cell of the first node U01 is or belongs to the second node U02.

In one embodiment, a camping cell of the third node U03 is or belongs to the second node U02.

In one embodiment, a cell to which the first node U01 belongs is or belongs to the second node U02.

In one embodiment, a cell to which the third node U03 belongs is or belongs to the second node U02.

In one embodiment, there is an RRC connection between the first node U01 and the third node U03.

In one embodiment, there is an RRC connection between the third node U03 and the second node U02.

In one embodiment, there is an RRC connection between the first node U01 and the second node U02.

In one embodiment, there is no RRC connection between the third node U03 and the second node U02.

In one embodiment, the third node U03 applies system information of the second node U02.

In one embodiment, the first node U01 applies system information forwarded by the third node U03.

In one embodiment, the first node U01 is in communication with the second node U02 via a direct path at least before receiving the first message.

In one embodiment, the first node U01 is in communication with the third node U03 via a sidelink.

In one embodiment, a direct link is established between the first node U01 and the third node U03.

In one embodiment, the first discovery message comprises a discovery message.

In one embodiment, the first discovery message is a NAS message.

In one embodiment, the first discovery message occupies sidelink resources.

In one embodiment, the first discovery message is transmitted on a sidelink.

In one embodiment, a name of the first discovery message includes discovery.

In one embodiment, the first cell identity is an NCI.

In one embodiment, the first cell identity is an ID of the second node U02.

In one embodiment, the first cell identity is an ID of a cell of the second node U02.

In one embodiment, a transmitter of the first message is the second node U02.

In one embodiment, a transmitter of the first signal is the third node U03.

In one embodiment, the first link layer identity is a link layer ID.

In one embodiment, the first link layer identity is a layer-2 ID.

In one embodiment, the first discovery message comprises the first link layer identity.

In one embodiment, a header of a MAC subPDU bearing the first discovery message comprises 8 most significant bits (MSB) of the first link layer identity, the first link layer identity comprising 24 bits, and the header of the MAC subPDU bearing the first discovery message does not comprise any bit other than the 8 MSB of the first link layer identity.

In one embodiment, a header of a MAC subPDU bearing the first discovery message comprises 16 most significant bits (MSB) of the first link layer identity, the first link layer identity comprising 24 bits, and the header of the MAC subPDU bearing the first discovery message does not comprise any bit other than the 16 MSB of the first link layer identity.

In one embodiment, a header of a MAC subPDU bearing the second message comprises 8 most significant bits (MSB) of the first link layer identity, the first link layer identity comprising 24 bits, and the header of the MAC subPDU bearing the second message does not comprise any bit other than the 8 MSB of the first link layer identity.

In one subembodiment, a MAC subPDU bearing the second message is transmitted through a sidelink.

In one embodiment, the first reference signal resource comprises an SSB.

In one embodiment, the first reference signal resource comprises a CSI-RS.

In one embodiment, the first reference signal resource comprises an SSB-index.

In one embodiment, the first reference signal resource comprises a CSI-RS-index.

In one embodiment, the first reference signal resource is indicated by the second node U02.

In one embodiment, the first reference signal resource is indicated by the first message.

In one embodiment, the first reference signal resource is a reference signal resource of the second node U02.

In one embodiment, the meaning of the sentence of evaluating a first measurement result according to a first reference signal resource comprises: measuring the first reference signal resource, where a measurement result on the first reference signal resource is the first measurement result.

In one embodiment, the meaning of the sentence of evaluating a first measurement result according to a first reference signal resource comprises: performing a measurement on the first reference signal resource, where a measurement result on the first reference signal resource is the first measurement result.

In one embodiment, the first measurement result is a Reference Signal Receiving Power (RSRP).

In one embodiment, the first measurement result is a Reference Signal Receiving Quality (RSRQ).

In one embodiment, the first measurement result is a Received Signal Strength Indication (RSSI).

In one embodiment, the first measurement result is a SIGNAL-NOISE RATIO (SNR).

In one embodiment, a transmitter of the first discovery message is a transmitter of the first signal.

In one embodiment, the sidelink signal transmitted by a transmitter of the first discovery message is or comprises a discovery message.

In one embodiment, the sidelink signal transmitted by a transmitter of the first discovery message is or comprises a reference signal.

In one embodiment, the meaning of the sentence of evaluating a second measurement result according to a sidelink signal transmitted by a transmitter of the first discovery message includes: measuring a sidelink signal transmitted by the transmitter of the first discovery message for obtaining the second measurement result.

In one embodiment, the meaning of the sentence of evaluating a second measurement result according to a sidelink signal transmitted by a transmitter of the first discovery message includes: measuring the first discovery message or physical resources occupied by the first discovery message or reference signal(s) comprised by the physical resource blocks occupied by the first discovery message for obtaining the second measurement result.

In one embodiment, the meaning of the sentence of evaluating a second measurement result according to a sidelink signal transmitted by a transmitter of the first discovery message includes: measuring a discovery message transmitted by the transmitter of the first discovery message for obtaining the second measurement result.

In one embodiment, the meaning of the sentence of evaluating a second measurement result according to a sidelink signal transmitted by a transmitter of the first discovery message includes: measuring a reference signal transmitted by the transmitter of the first discovery message on sidelink for obtaining the second measurement result.

In one embodiment, the meaning of the sentence of evaluating a second measurement result according to a sidelink signal transmitted by a transmitter of the first discovery message includes: measuring signal(s) transmitted by the transmitter of the first discovery message on at least one of {PBSCH, PSSCH, PSCCH} for obtaining the second measurement result.

In one embodiment, the second measurement result is a Sidelink Reference Signal Receiving Power (SL-RSRP).

In one embodiment, the second measurement result is a SD-RSRP.

In one embodiment, the second measurement result is an RSRP obtained according to a discovery message.

In one embodiment, the second measurement result is a PSBCH reference signal received power (PSBCH RSRP).

In one embodiment, the second measurement result is a PSSCH reference signal received power (PSSCH-RSRP).

In one embodiment, the second measurement result is a PSCCH reference signal received power (PSCCH-RSRP).

In one embodiment, the second measurement result is a Sidelink received signal strength indicator (SL RSSI).

In one embodiment, the second measurement result is a Sidelink channel occupancy ratio (SL CR).

In one embodiment, the second measurement result is a Sidelink channel busy ratio (SL CBR).

In one embodiment, the third message is or comprises a measurement report.

In one embodiment, the third message is an RRC message.

In one embodiment, the third message is or comprises MCGfailureinformation.

In one embodiment, the third message is or comprises SCGfailureinformation.

In one embodiment, the third message is or comprises UEAssistanceInformation.

In one embodiment, a transport channel occupied by the third message is a UL-SCH.

In one embodiment, the third message is not forwarded by the third node U03.

In one embodiment, the third message uses an SRB.

In one embodiment, the third message comprises the first link layer identity.

In one embodiment, the third message comprises an index of the first link layer identity.

In one embodiment, the first message indicates a conditional switch from a direct path to an indirect path.

In one subembodiment, the conditional switch from a direct path to an indirect path refers to a conditional reconfiguration for the switch from a direct path to an indirect path.

In one subembodiment, the conditional switch from a direct path to an indirect path refers to relating to reconfiguration and an RLC bearer mapped to radio bearer(s) but not relating to any change made to the existing conditional reconfiguration of radio bearer(s).

In one subembodiment, the conditional switch from a direct path to an indirect path refers to a radio bearer reconfiguration.

In one subembodiment, the conditional switch from a direct path to an indirect path refers to an RLC bearer reconfiguration.

In one subembodiment, the conditional switch from a direct path to an indirect path does not change a SpCellConfig.

In one embodiment, after the first node U01 switches from the direct path to the indirect path, the serving cell of the first node remains to be the second node U02.

In one embodiment, the second node U02 indicates the first threshold and the second threshold.

In one embodiment, the first message indicates the first threshold and the second threshold.

In one embodiment, the first node U01 does not perform a switch from the direct path to the indirect path immediately after receiving the first message, but instead, waits till the first condition is satisfied to perform the switch from the direct path to the indirect path.

In one embodiment, forwarding a second message in the step S5303 comprises: receiving a first MAC PDU bearing the second message; extracting a first RLC PDU from the first MAC PDU, and extracting a first adaptation layer PDU from the first RLC PDU, and determining according to a header of the first adaptation layer PDU that data carried by the first adaptation layer PDU is for an RLC channel of a Uu interface; the first adaptation layer PDU carrying a first PDCP PDU, the first PDCP PDU comprising the second message; packaging and transmitting the first PDCP PDU to the second node U02 via a Uu interface.

In one embodiment, forwarding a second message in the step S5303 comprises: receiving a PDU bearing the second message on the sidelink, and transmitting the PDU bearing the second message to the second node U02.

In one subembodiment, the PDU bearing the second message comprises a PDCP PDU.

In one subembodiment, the action of transmitting the PDU bearing the second message to the second node U02 comprises: transmitting the PDU bearing the second message on a PUSCH.

In one subembodiment, the action of transmitting the PDU bearing the second message to the second node U02 comprises: packaging the PDU bearing the second message in an RLC PDU.

In one subembodiment, the action of transmitting the PDU bearing the second message to the second node U02 comprises: packaging the PDU bearing the second message in an adaptation layer PDU.

In one subembodiment, the action of transmitting the PDU bearing the second message to the second node U02 comprises: packaging the PDU bearing the second message in a MAC PDU.

In one subembodiment, the action of transmitting the PDU bearing the second message to the second node U02 comprises: packaging the PDU bearing the second message in a PDU of a protocol layer between a PDCP layer and an RLC layer.

In one embodiment, forwarding a second message in the step S5303 comprises: relaying the second message.

In one embodiment, the first node U01, during the time while the first timer is running, maintains a conditional reconfiguration evaluation for CHO and stops an evaluation of a conditional switch from a direct path to an indirect path.

In one embodiment, the sentence of maintaining a conditional reconfiguration evaluation for a CHO means that: running of the first timer does not affect the evaluation of conditional reconfiguration for CHO.

In one embodiment, the sentence of maintaining a conditional reconfiguration evaluation for a CHO means that: running of the first timer does not affect the evaluation about whether conditional reconfiguration for CHO is satisfied.

In one embodiment, the sentence of maintaining a conditional reconfiguration evaluation for a CHO means that: during the time while the first timer is running, the evaluation about whether conditional reconfiguration for CHO is satisfied which has already been started is not to be stopped.

In one embodiment, the sentence of maintaining a conditional reconfiguration evaluation for a CHO means that: during the time while the first timer is running, the evaluation about whether conditional reconfiguration for CHO is satisfied can be started.

In one embodiment, the sentence of maintaining a conditional reconfiguration evaluation for a CHO means that: during the time while the first timer is running, a re-evaluation about conditional reconfiguration for CHO can be made.

In one embodiment, the sentence of maintaining the evaluation of a conditional reconfiguration for a CHO means: evaluating whether conditions of the conditional reconfiguration for the CHO are satisfied.

In one embodiment, the sentence of stopping an evaluation of a conditional switch from a direct path to an indirect path includes a meaning that: the running of the first timer triggers termination of the evaluation of the conditional switch from the direct path to the indirect path.

In one embodiment, the sentence of stopping an evaluation of a conditional switch from a direct path to an indirect path includes a meaning that: during the time while the first timer is running no evaluation of the conditional switch from the direct path to the indirect path is performed.

In one embodiment, the sentence of stopping an evaluation of a conditional switch from a direct path to an indirect path includes a meaning that: the running of the first timer promotes termination of the evaluation of the conditional switch from the direct path to the indirect path which is still ongoing and not yet completed.

In one embodiment, the sentence of stopping the evaluation of a conditional switch from a direct path to an indirect path includes a meaning that: evaluating whether conditions of the conditional switch from the direct path to the indirect path are satisfied.

In one embodiment, the first message indicates conditions of a conditional switch from a direct path to an indirect path.

In one embodiment, the first message indicates a conditional reconfiguration for CHO.

In one embodiment, a conditional switch from a direct path to an indirect path is a conditional reconfiguration for switching from the direct path to the indirect path.

In one embodiment, the above method is advantageous in that during the time while the first timer is running, a UE can still perform CHO-type switch to ensure the traffic continuity of the UE.

In one embodiment, the above method is advantageous in that during the time while the first timer is running, a UE stops a conditional switch from a direct path to an indirect path, which contributes to the reduction of complexity and ensures the consistency between UE and network behaviors, hence the avoidance of unnecessary confusion.

In one embodiment, the sentence that the first message indicates a switch from a direct path to an indirect path when a first condition is satisfied means that: the first condition being satisfied triggers that the first node switches from a direct path to an indirect path.

In one embodiment, the sentence that the first message indicates a switch from a direct path to an indirect path when a first condition is satisfied means that: as a response to the first condition being satisfied, the first node switches from a direct path to an indirect path.

In one embodiment, the sentence that the first message indicates a switch from a direct path to an indirect path when a first condition is satisfied means that: when the first condition is satisfied, the first node performs configurations relating to the usage of indirect-path transmission associated with the first condition.

Embodiment 6

Figure 6:
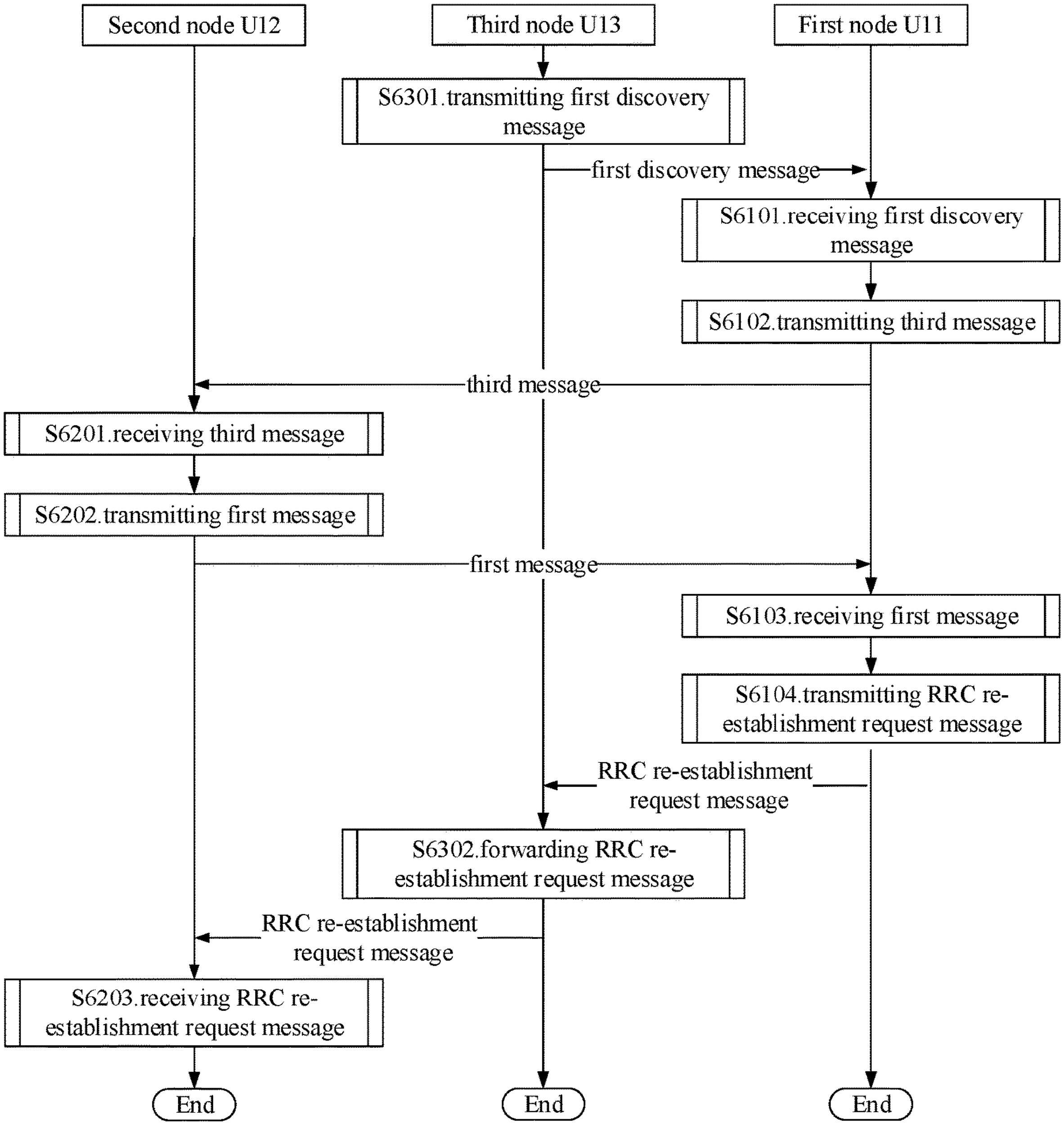
FIG. 6 illustrates a flowchart of radio signal transmission according to one embodiment of the present application.

Embodiment 6 illustrates a flowchart of radio signal transmission according to one embodiment of the present application, as shown in FIG. 6. In FIG. 6, U11 corresponds to a first node in the present application, U12 corresponds to a second node in the present application, and U13 corresponds to a third node in the present application. It should be particularly noted that the order presented in this embodiment does not limit the order of signal transmissions or the order of implementations of the present application.

The first node U11 receives a first discovery message in step S6101; transmits a third message in step S6102; receives a first message in step S6103; and transmits an RRC re-establishment request message in step S6104.

The second node U12 receives a third message in step S6201; transmits a first message in step S6202; and receives an RRC re-establishment request message in step S6203.

The third node U13 transmits a first discovery message in step S6301; and forwards an RRC re-establishment request message in step S6302.

Embodiment 6 illustrates an RRC re-establishment procedure; with Embodiment 5 as the foundation, the content necessary but not explained in Embodiment 6 can refer to Embodiment 5.

In one embodiment, the RRC re-establishment comprises: selecting a third node, the third node belonging to a first candidate relay list, the first candidate relay list being related to a switch from a direct path to an indirect path; transmitting an RRC re-establishment request message via the third node using the indirect path; and deleting the first candidate relay list as a response to applying the first message;

herein, during a procedure while the first message is applied, a first candidate cell list is reserved, the first candidate cell list being related to a conditional reconfiguration; the first candidate cell list comprises at least one cell.

In one embodiment, the first discovery message comprises a relay service code.

In one subembodiment, the relay service code comprised by the first discovery message indicates support for relay traffics.

In one subembodiment, the relay service code comprised by the first discovery message indicates support for L2 relay traffics.

In one embodiment, the first discovery message comprises a cell ID of the second node U12.

In one embodiment, the first discovery message comprises a cell NCI of the second node U12.

In one embodiment, the second node U12 is a serving cell of the first node U11.

In one embodiment, the second node U12 is a serving cell of the third node U13.

In one embodiment, the third message is transmitted after the first discovery message is received.

In one embodiment, a reception of the first discovery message triggers a transmission of the third message.

In one embodiment, the first message indicates a conditional reconfiguration.

In one embodiment, each node comprised by the first candidate relay list is a UE.

In one embodiment, each node comprised by the first candidate relay list is a relay.

In one embodiment, the first message indicates a conditional reconfiguration for a conditional handover (CHO).

In one subembodiment, the conditional reconfiguration for the CHO indicated by the first message comprises a reconfigurationWithSync.

In one subembodiment, each candidate cell comprised by the conditional reconfiguration for the CHO is preserved in the first candidate cell list.

In one subembodiment, all candidate cells comprised by the conditional reconfiguration for the CHO constitute the first candidate cell list.

In one subembodiment, the first candidate cell list is a VarConditionalReconfig.

In one subembodiment, the first candidate cell list is preserved in a VarConditionalReconfig.

In one embodiment, the conditional reconfiguration for the CHO indicated by the first message comprises a SpCellConfig.

In one subembodiment, the conditional reconfiguration indicated by the first message comprises a reconfigurationWithSync.

In one embodiment, the first message indicates a conditional reconfiguration for a switch from a direct path to an indirect path.

In one subembodiment, the conditional reconfiguration for the switch from the direct path to the indirect path indicated by the first message does not comprise a SpCellConfig.

In one subembodiment, the conditional reconfiguration for a switch from a direct path to an indirect path indicated by the first message does not comprise a reconfigurationWithSync.

In one subembodiment, any candidate relay node for a switch from a direct path to an indirect path indicated by the first message is preserved in the first candidate relay list.

In one subembodiment, candidate relay nodes for a switch from a direct path to an indirect path indicated by the first message constitute the first candidate relay list.

In one subembodiment, the first candidate relay list is a VarConditionalReconfig.

In one subembodiment, the first candidate relay list is preserved in a VarConditionalReconfig.

In one subembodiment, the first candidate relay list is preserved in a state variable other than a VarConditionalReconfig.

In one subembodiment, the first candidate relay list comprises link layer identity/identities of candidate relay(s).

In one subembodiment, the first candidate relay list comprises the first link layer identity.

In one embodiment, the first message notifies an indication of a conditional reconfiguration for a CHO and a conditional reconfiguration for a switch from a direct path to an indirect path.

In one embodiment, a conditional reconfiguration for a CHO and a conditional reconfiguration for a switch from a direct path to an indirect path can share a same name or have different names.

In one embodiment, a radio link failure (RLF) occurs after the first node U11 receives the first message.

In one embodiment, an RRC re-establishment is triggered after the first node U11 receives the first message.

In one subembodiment, an expiration of the first timer triggers the RRC re-establishment.

In one embodiment, the RRC re-establishment comprises performing relay selection, and a relay node selected by the first node U11 in the relay selection procedure is the third node U13.

In one embodiment, the RRC re-establishment comprises performing cell selection, and a node selected by the first node U11 in the cell selection procedure is the third node U13.

In one embodiment, the RRC re-establishment comprises performing cell and relay selection, and a node selected by the first node U11 in the cell and relay selection procedure is the third node U13.

In one embodiment, the phrase that the first message is applied means: applying a triggered conditional reconfiguration in the first message.

In one embodiment, the phrase that the first message is applied means: applying a configuration in the first message required to be applied because of conditions being satisfied.

In one embodiment, the phrase that the first message is applied means: applying a configuration in the first message related to the third node U13.

In one embodiment, the phrase that the first message is applied means: applying a configuration in the first message related to the third node U13 being selected as a relay.

In one embodiment, the phrase that the first message is applied means: applying a configuration in the first message related to an indirect-path transmission relating to the third node U13.

In one embodiment, the phrase that the first message is applied means: applying a configuration in the first message related to performing an indirect-path transmission via the third node U13.

In one embodiment, the RRC re-establishment request message is a RRCReestablishmentRequest.

In one embodiment, the RRC re-establishment request message is a RRCConnectionReestablishmentRequest.

Embodiment 7

Figure 7:
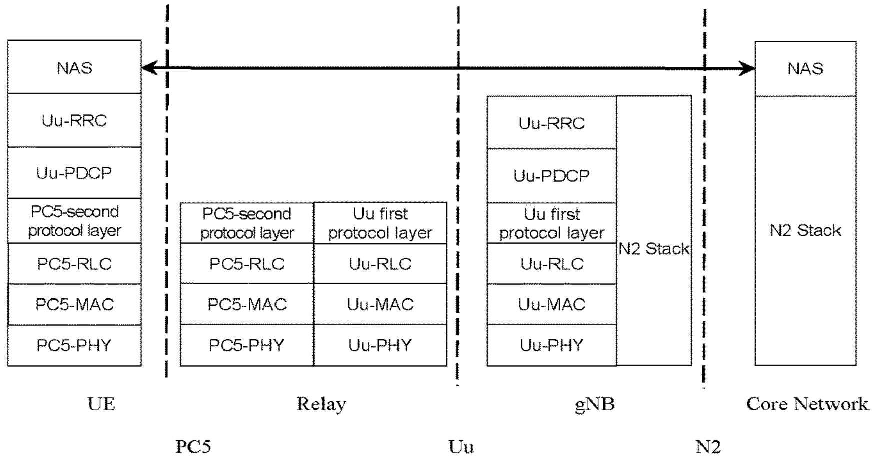
FIG. 7 illustrates a schematic diagram of a protocol stack of relay communications according to one embodiment of the present application.

Embodiment 7 illustrates a schematic diagram of a protocol stack of relay communications according to one embodiment of the present application, as shown in FIG. 7.

In the protocol stack illustrated in FIG. 7, first protocol layers are respectively terminated at a UE and a relay node, a relay node and a gNB node.

In one embodiment, the UE in FIG. 7 corresponds the first node in the present application, and the relay in FIG. 7 corresponds to the third node in the present application; the gNB shown in FIG. 7 corresponds to the third node in the present application; FIG. 7 illustrates a L2 relay.

In one embodiment, with Embodiment 3 as the foundation, Embodiment 7 further illustrates a protocol stack and interfaces related to the relay node; In Embodiment 7, NAS is a Non-Access Stratum; Uu-RRC is an RRC protocol of a Uu interface; Uu-PDCP is a PDCP layer of the Uu interface; Uu-RLC is an RLC layer of the Uu interface; Uu-MAC is a MAC layer of the Uu interface; Uu-PHY is a physical layer of the Uu interface; PC5-RLC is an RLC layer of a PC5 interface; PC5-MAC is a MAC layer of the PC5 interface; PC5-PHY is a physical layer of the PC5 interface; N2 Stack is a protocol stack of a N2 interface, where the N2 interface is an interface between a gNB and a core network; a Uu first protocol layer is a first protocol layer of the Uu interface; a PC5-second protocol layer is a second protocol layer of the PC5 interface.

In one embodiment, the prefix Uu- in FIG. 7 represents a protocol layer of a Uu interface.

In one embodiment, the prefix PC5- in FIG. 7 represents a protocol layer of a PC5 interface.

In one embodiment, a communication interface between the UE and the gNB in FIG. 7 is a Uu interface.

In one embodiment, a communication interface between the relay and the gNB in FIG. 7 is a Uu interface.

In one embodiment, a communication interface between the UE and the relay in FIG. 7 is a PC5 interface.

In one embodiment, the first protocol layer is an adaptation layer.

In one embodiment, the second protocol layer is an adaptation layer.

In one embodiment, the first protocol layer is a protocol layer between a PDCP layer and an RLC layer.

In one embodiment, the second protocol layer is a protocol layer between a PDCP layer and an RLC layer.

In one embodiment, the Uu first protocol layer is used for multiplexing data of multiple radio bearers onto a same Uu-RLC bearer/entity.

In one embodiment, the PC5-second protocol layer is used for multiplexing data of multiple radio bearers onto a same PC5-RLC bearer/entity.

In one embodiment, the PC5-second protocol layer is used for mapping of a PC5-RLC bearer/entity.

In one embodiment, the first protocol layer is used for associating one or more PC5-RLC entities with a Uu-RLC entity.

In one embodiment, the second protocol layer is used for associating one or more PC5-RLC entities with a Uu-RLC entity.

In one embodiment, the PC5-second protocol layer in FIG. 7 is an adaptation layer of the PC5 interface.

In one embodiment, the Uu first protocol layer in FIG. 7 is an adaptation layer of the Uu interface.

In one embodiment, a peer PDCP entity of a PDCP entity of the UE in FIG. 7 is located in a gNB.

In one embodiment, a peer RRC entity of an RRC entity of the UE in FIG. 7 is located in a gNB.

In one embodiment, the first signal is a signal between the UE and the relay, generated by a PC5-PHY or a PC5-MAC or a PC5-RLC or a PC5-second protocol layer or a PC5-RRC or a PC5-S.

In one embodiment, the second signal is a signal between the UE and the relay, generated by a PC5-PHY or a PC5-MAC or a PC5-RLC or a PC5-second protocol layer or a PC5-RRC or a PC5-S.

In one embodiment, the first message is generated by the gNB, the first message being a Uu-RRC message.

In one embodiment, the second message is generated by the first node, the second message being a Uu-RRC message.

In one embodiment, the second message is transparent to the relay.

In one embodiment, the UE in FIG. 7 is a U2N remote UE.

In one embodiment, the relay in FIG. 7 is a U2N relay UE.

In one embodiment, the direct path refers to a path for direct communications between the UE and the gNB without forwarding of the relay.

In one embodiment, when using the direct-path transmission, the UE does not use the PC5-second protocol layer, or the PC5-RLC layer or the PC5-MAC, or the PC5-PHY, and below the Uu-PDCP layer are respectively the Uu-RLC, the Uu-MAC and the Uu-PHY.

In one embodiment, a switch from a direct path to an indirect path comprises at least adding or modifying an entity/entities corresponding to protocol layer(s) below a Uu-PDCP layer.

In one subembodiment, the entity/entities corresponding to protocol layer(s) below the Uu-PDCP layer is(are) at least one of entities corresponding to {Uu-RLC, Uu-MAC, Uu-PHY} layers.

In one subembodiment, a switch from a direct path to an indirect path comprises associating a protocol entity corresponding to a Uu-PDCP protocol layer with the at least added or modified entity/entities corresponding to protocol layer(s) below a Uu-PDCP layer.

In one embodiment, switching from a direct path to an indirect path comprises at least transmitting a PDCP status report.

In one embodiment, the indirect path refers to a path for communications between the UE and the gNB with forwarding of the relay.

In one embodiment, the indirect-path transmission at least requires the usage of a sidelink or a PC5 interface for transmission.

In one embodiment, FIG. 7 illustrates a way of implementation of indirect-path transmission.

In one embodiment, the Uu first protocol layer in the relay bears an SDU of the PC5-second protocol layer in the relay.

In one embodiment, the PC5-second protocol layer in the relay bears an SDU of the Uu first protocol layer in the relay.

In one embodiment, the first signal is generated by the relay, and the first signal is transmitted through a PC5 interface.

Embodiment 8

Figure 8:
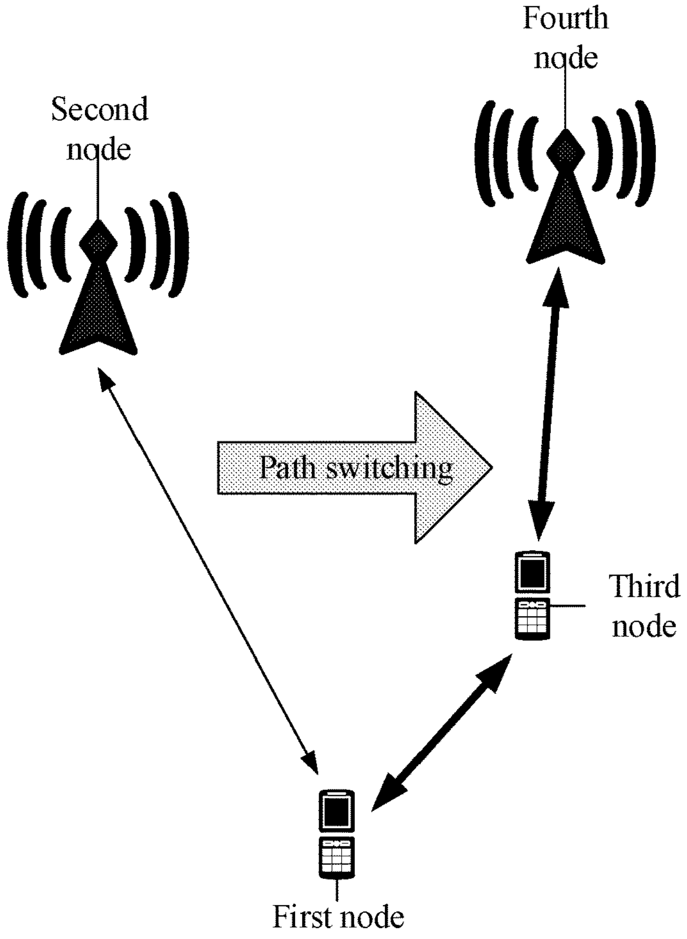
FIG. 8 illustrates a schematic diagram of path switch according to one embodiment of the present application.

Embodiment 8 illustrates a schematic diagram of path switch according to one embodiment of the present application, as shown in FIG. 8.

A first node in Embodiment 8 corresponds to the first node in the present application; a second node in Embodiment 8 corresponds to the second node in the present application; a third node in Embodiment 8 corresponds to the third node in the present application; a fourth node in Embodiment 8 is a cell or base station or cell group other than the second node.

The arrowhead marked with "path switching" in FIG. 8 indicates the first node experiences a switch from a direct-path transmission to an indirect-path transmission, where the direct path is a link of direct communication between the first node and the second node; the indirect path is a link of the first node in communication with the fourth node via the third node; it should be noted that although the fourth node is different from the second node in FIG. 8, the method provided by the present application is also applicable to scenarios where the fourth node and the second node are the same node; both the direct-path transmission and the indirect-path transmission refer to the transmission between the first node and the network.

In one embodiment, a configuration for the indirect-path communication via the third node is a part of a conditional reconfiguration for a CHO of the fourth node.

In one embodiment, the first message indicates a first conditional reconfiguration for a CHO of the fourth node, the first conditional reconfiguration comprising a configuration for an indirect-path transmission via the third node.

In one subembodiment, the CHO refers to Conditional Handover, immediately after the first node completes the CHO, a PCell of the first node changes from the second node to the fourth node.

In one subembodiment, when performing the first conditional reconfiguration, the first node starts a timer T304, and the first signal is used for stopping the timer T340.

In one subembodiment, when performing the first conditional reconfiguration, the first node only starts the first timer, rather than the timer T340.

In one subembodiment, when performing the first conditional reconfiguration, the first node both starts a timer T304 and starts the first timer, and a stop of the first timer triggers the timer T304 being stopped.

In one embodiment, the second node has a different PCI from the fourth node, the second node and the fourth node belonging to a same DU or being managed by a same DU.

In one embodiment, the second node and the fourth node belong to a same cell group.

In one embodiment, the second node and the fourth node respectively belong to an MCG and an SCG of the first node.

In one embodiment, the first node maintains a first candidate cell list for CHO, and a first candidate relay list for a conditional switch from a direct path to an indirect path; the first candidate cell list comprises candidate cell(s) for a CHO, and the first candidate relay list comprises candidate relay(s) for a conditional path switching; the first message indicates the first candidate cell list and the first candidate relay list, after receiving the first message the first node has a radio link failure, and as a response to having a radio link failure, the first node performs an RRC re-establishment.

In one subembodiment, the RRC re-establishment comprises selecting a first cell, the first cell belonging to the first candidate cell list, and the first node applies a RRCReconfiguration for the first cell, and as a response to the action of applying the RRCReconfiguration for the first cell, the first node deletes the first candidate cell list and deletes a PCell as a relay of the first cell in the first candidate relay list.

In one subembodiment, the RRC re-establishment comprises selecting a first relay, the first relay belonging to the first candidate relay list, and the first node applies a configuration for the first relay, and as a response to the action of applying the configuration for the first cell, the first node deletes the first candidate relay list and deletes a PCell of the first relay in the first candidate cell list.

In one embodiment, the path switching means to stop using direct-path transmission and start to use indirect-path transmission, if no change of a SpCell is concerned in the path switching procedure, the path switching is quite different from inter-cell handover in the traditional sense; If the change of a SpCell is concerned in the path switching procedure, the path switching can be performed in the procedure of a traditional inter-cell handover; in short, the conventional inter-cell handover does not relate to the path switching.

Embodiment 9

Figure 9:
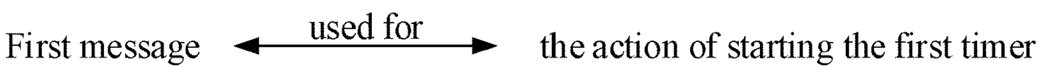
FIG. 9 illustrates a schematic diagram of a first message being used for the action of starting the first timer according to one embodiment of the present application.

Embodiment 9 illustrates a schematic diagram of a first message being used for the action of starting the first timer according to one embodiment of the present application, as shown in FIG. 9.

In one embodiment, the first message is executed or applied immediately after being received, where the execution or application of the first message triggers a start of the first timer.

In one embodiment, reception of the first message triggers a start of the first counter.

In one embodiment, application of the first message triggers a start of the first counter.

In one embodiment, execution of the first message triggers a start of the first counter.

In one embodiment, the first message comprises configuration information of the first timer.

In one subembodiment, the configuration information of the first timer comprises an expiration time of the first timer.

In one subembodiment, the configuration information of the first timer comprises time of the first timer.

In one embodiment, configurations comprised in the first message to be performed when certain conditions are satisfied being performed trigger the first timer.

In one embodiment, configurations comprised in the first message to be applied when certain conditions are satisfied being applied trigger the first timer.

In one embodiment, when a conditional reconfiguration is performed, at least partial configuration for the conditional reconfiguration comprised by the first message being applied triggers a start of the first timer.

In one embodiment, a configuration associated with the first condition in the first message being performed is used for triggering a start of the first timer.

In one subembodiment, the configuration associated with the first condition is a configuration to be applied or performed triggered by the first condition being satisfied.

In one subembodiment, the configuration associated with the first condition is one or several fields in the first message.

In one subembodiment, the configuration associated with the first condition is one or several Information Elements (IEs) in the first message.

In one subembodiment, after the configuration associated with the first condition is performed or applied, how the first node communicates with the network is by or switches to an indirect-path transmission.

In one subembodiment, as a response to a configuration associated with the first condition in the first message being performed, the first node starts the first timer.

In one subembodiment, a start of the first timer is a part of a configuration associated with the first condition in the first message being performed Embodiment 10

Figure 10:
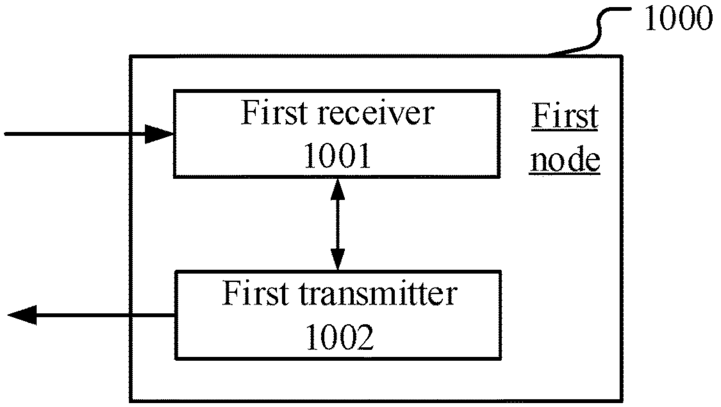
FIG. 10 illustrates a structure block diagram of a processing device in a first node according to one embodiment of the present application.

Embodiment 10 illustrates a structure block diagram of a processing device used in a first node according to one embodiment of the present application; as shown in FIG. 10.

In FIG. 10, a processing device 1000 in the first node is comprised of a first receiver 1001 and a first transmitter 1002. In Embodiment 10, the first receiver 1001 receives a first message, the first message indicating a switch from a direct path to an indirect path; and starts a first timer; an expiration of the first timer triggering an RRC re-establishment;

the first receiver 1001 receives a first signal on a sidelink after the action of starting a first timer and before the expiration of the first timer; and stops the first timer as a response to receiving the first signal; and the first transmitter 1002 transmits a second message, the second message used for feedback of the first message;

herein, the first message is transmitted via the direct path; the second message is transmitted via the indirect path; the first message and the second message are RRC messages, respectively; the second message is relayed by a transmitter of the first signal; the first message is used for the action of starting the first timer.

In one embodiment, the first signal comprises a packet generated by a transmitter of any said first message.

In one embodiment, the first signal comprises a first signaling, the first signaling for indicating that the indirect path has been established.

In one embodiment, the first signal comprises a second signaling, the second signaling for acknowledging that a direct link between the first node and a transmitter of the first signal has been successfully established; the second signaling comprises a relay service code; the second signaling is a PC5-S message.

In one embodiment, the first receiver 1001 receives a first discovery message, the first discovery message comprising a first cell identity, the first cell identity being a cell identity of a transmitter of the first message; the first discovery message comprising a first link-layer identity of the transmitter of the first signal; and evaluates a first measurement result according to a first reference signal resource; and evaluates a second measurement result according to a sidelink signal transmitted by a transmitter of the first discovery message; and the first transmitter 1002 transmits a third message via the direct path, the third message indicating the first link-layer identity;

herein, the first message indicates a switch from a direct path to an indirect path when a first condition is satisfied; the first condition comprises that the first measurement result is lower than a first threshold and the second measurement result is higher than a second threshold; the first message comprises the first link-layer identity; the first condition is satisfied; a configuration associated with the first condition in the first message being performed is used for triggering a start of the first timer.

In one embodiment, the RRC re-establishment comprises: selecting a third node, the third node belonging to a first candidate relay list, the first candidate relay list being related to a switch from a direct path to an indirect path; transmitting an RRC re-establishment request message via the third node using the indirect path; and deleting the first candidate relay list as a response to applying the first message;

herein, during a procedure while the first message is applied, a first candidate cell list is reserved, the first candidate cell list being related to a conditional reconfiguration; the first candidate cell list comprises at least one cell.

In one embodiment, the first receiver 1001, during a time while the first timer is running, maintains a conditional reconfiguration evaluation for a Conditional Handover (CHO), and stops an evaluation of a conditional switch from a direct path to an indirect path.

In one embodiment, the first receiver 1001 receives a first message, the first message indicating a switch from a direct path to an indirect path via a third node; and determines whether to start a first timer according to whether a direct link to the third node has been established;

the first transmitter 1002 transmits a second message, the second message used for feedback of the first message;

herein, the first message is transmitted via the direct path; the second message is transmitted through the indirect path via the third node; the first message and the second message are RRC messages, respectively; the second message is relayed by the third node; the first message comprises a first link-layer identity, the first link-layer identity comprising 24 bits; the first link-layer identity is an identity of the third node; the sentence of determining whether to start a first timer according to whether a direct link to the third node has been established means:

when a direct link to the third node is established, not starting the first timer;

when a direct link to the third node is not established, starting the first timer;

a relay service code is used for establishing the direct link; the phrase "via the third node" means that the third node is a relay on the indirect path.

In one embodiment, an expiration of the first timer is used for triggering an RRC re-establishment.

In one embodiment, the first node is a UE.

In one embodiment, the first node is a terminal supporting large delay difference.

In one embodiment, the first node is a terminal supporting NTN.

In one embodiment, the first node is an aircraft.

In one embodiment, the first node is a vehicle-mounted terminal.

In one embodiment, the first node is a relay.

In one embodiment, the first node is a vessel.

In one embodiment, the first node is an IoT terminal.

In one embodiment, the first node is an IIoT terminal.

In one embodiment, the first node is a piece of equipment supporting transmissions with low delay and high reliability.

In one embodiment, the first node is a sidelink communication node.

In one embodiment, the first receiver 1001 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1002 comprises at least one of the antenna 452, the transmitter 454, the transmitting processor 468, the multi-antenna transmitting processor 457, the controller/processor 459, the memory 460 or the data source 467 in Embodiment 4.

Embodiment 11

Figure 11:
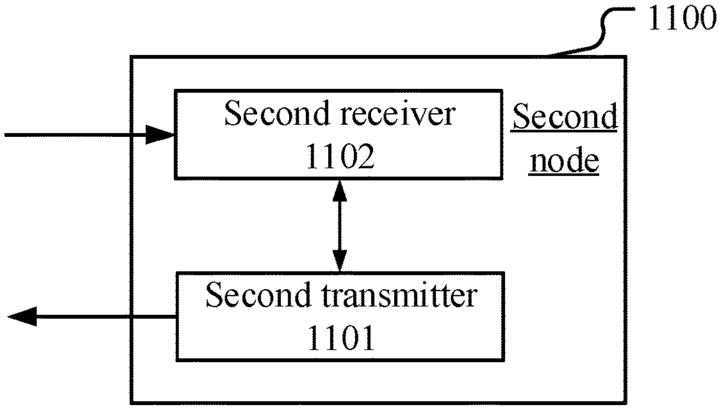
FIG. 11 illustrates a structure block diagram of a processing device in a second node according to one embodiment of the present application.

Embodiment 11 illustrates a structure block diagram of a processing device used in a second node according to one embodiment of the present application; as shown in FIG. 11. In FIG. 11, a processing device 1100 in the second node is comprised of a second transmitter 1101 and a second receiver 1102. In Embodiment 11, the second transmitter 1101 transmits a first message, the first message indicating a switch from a direct path to an indirect path; and the second receiver 1102 receives a second message, the second message used for feedback of the first message;

herein, a transmitter of the second message starts a first timer, where an expiration of the first timer triggers an RRC re-establishment, and receives a first signal on a sidelink after the action of starting a first timer and before the expiration of the first timer; the first signal is used for stopping the first timer; the first message is transmitted via the direct path; the second message is transmitted via the indirect path; the first message and the second message are RRC messages, respectively; the second message is relayed by a transmitter of the first signal; the first message is used for the action of starting the first timer.

In one embodiment, the second receiver 1102 receives a third message via the direct path, the third message indicating the first link-layer identity; a first reference signal resource is used for evaluating a first measurement result; a sidelink signal is used for evaluating a second measurement result;

herein, the first message indicates a switch from a direct path to an indirect path when a first condition is satisfied; the first condition comprises that the first measurement result is lower than a first threshold and the second measurement result is higher than a second threshold; the first message comprises the first link-layer identity; a configuration associated with the first condition in the first message being performed is used for triggering a start of the first timer.

In one embodiment, the RRC re-establishment comprises: receiving an RRC re-establishment request message via the third node using the indirect path.

In one embodiment, the second node is a satellite.

In one embodiment, the second node is an IoT node.

In one embodiment, the second node is a relay.

In one embodiment, the second node is an access point.

In one embodiment, the second node is a base station.

In one embodiment, the second transmitter 1101 comprises at least one of the antenna 420, the transmitter 418, the transmitting processor 416, the multi-antenna transmitting processor 471, the controller/processor 475 or the memory 476 in Embodiment 4.

In one embodiment, the second receiver 1102 comprises at least one of the antenna 420, the receiver 418, the receiving processor 470, the multi-antenna receiving processor 472, the controller/processor 475 or the memory 476 in Embodiment 4.

Embodiment 12

Figure 12:
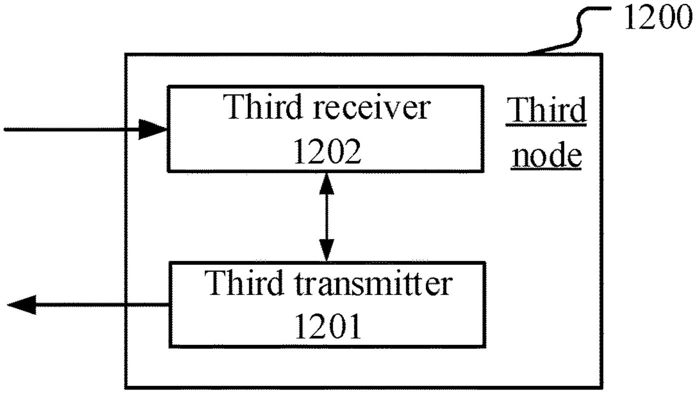
FIG. 12 illustrates a structure block diagram a processing device in a third node according to one embodiment of the present application.

Embodiment 12 illustrates a structure block diagram of a processing device used in a third node according to one embodiment of the present application; as shown in FIG. 12. In FIG. 12, a processing device 1200 in the third node is comprised of a third receiver 1202 and a third transmitter 1201. In Embodiment 12, the third transmitter 1201 forwards a second message, the second message used for feedback of the first message;

the third transmitter 1201 transmits a first signal on a sidelink after the action of starting a first timer and before the expiration of the first timer;

herein, a transmitter of the second message starts a first timer, where an expiration of the first timer is used for triggering an RRC re-establishment; the first signal is used for stopping the first timer; the first message indicating a switch from a direct path to an indirect path; the first message is transmitted via the direct path; the second message is transmitted via the indirect path; the first message and the second message are RRC messages, respectively; the first message is used for the action of starting the first timer.

In one embodiment, the first signal comprises a packet generated by a transmitter of any said first message.

In one embodiment, the first signal comprises a first signaling, the first signaling for indicating that the indirect path has been established.

In one embodiment, the first signal comprises a second signaling, the second signaling for acknowledging that a direct link between the first node and the third node has been successfully established; the second signaling comprises a relay service code; the second signaling is a PC5-S message.

In one embodiment, the third transmitter 1201 transmits a first discovery message and a sidelink signal, the first discovery message comprising a first cell identity, the first cell identity being a cell identity of a transmitter of the first message; the first discovery message comprising a first link-layer identity of the third node; a first reference signal resource is used for evaluating a first measurement result; the sidelink signal is used for evaluating a second measurement result;

herein, the first message indicates a switch from a direct path to an indirect path when a first condition is satisfied; the first condition comprises that the first measurement result is lower than a first threshold and the second measurement result is higher than a second threshold; the first message comprises the first link-layer identity; a configuration associated with the first condition in the first message being performed is used for triggering a start of the first timer.

In one embodiment, the RRC re-establishment comprises: selecting the third node, the third node belonging to a first candidate relay list, the first candidate relay list being related to a switch from a direct path to an indirect path; transmitting an RRC re-establishment request message via the third node using the indirect path; and deleting the first candidate relay list as a response to applying the first message;

herein, during a procedure while the first message is applied, a first candidate cell list is reserved, the first candidate cell list being related to a conditional reconfiguration; the first candidate cell list comprises at least one cell.

In one embodiment, the third node is a UE.

In one embodiment, the third node is a terminal supporting large delay difference.

In one embodiment, the third node is a terminal supporting NTN.

In one embodiment, the third node is an aircraft.

In one embodiment, the third node is a vehicle-mounted terminal.

In one embodiment, the third node is a relay.

In one embodiment, the third node is a vessel.

In one embodiment, the third node is an IoT terminal.

In one embodiment, the third node is an IIoT terminal.

In one embodiment, the third node is a piece of equipment supporting transmissions with low delay and high reliability.

In one embodiment, the third node is a sidelink communication node.

In one embodiment, the third receiver 1202 comprises at least one of the antenna 452, the receiver 454, the receiving processor 456, the multi-antenna receiving processor 458, the controller/processor 459, the memory 460 or the data source 467 in Embodiment 4.

In one embodiment, the third transmitter 1201 comprises at least one of the antenna 452, the transmitter 454, the transmitting processor 468, the multi-antenna transmitting processor 457, the controller/processor 459, the memory 460 or the data source 467 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, and NTN UE, etc. The base station or system device in the present application includes but is not limited to macro-cellular base stations, micro-cellular base stations, home base stations, relay base station, gNB (NR node B), Transmitter Receiver Point (TRP), NTN base station, satellite equipment and fight platform, and other radio communication equipment.

This disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:

a first receiver, receiving a first message; and starting a first timer, wherein an expiration of the first timer triggers a Radio Resource Control (RRC) re-establishment;

the first receiver, receiving a first signal on a sidelink after starting a first timer and before the expiration of the first timer; and stopping the first timer in response to receiving the first signal;

a first transmitter, transmitting a second message used for feedback of the first message, wherein the first message is transmitted via the direct path, the second message is transmitted via the indirect path, the first and second messages are RRC messages, the second message is relayed by a transmitter of the first signal, and the first message is used for starting the first timer;

the first receiver, receiving a first discovery message, the first discovery message comprising a first cell identity, the first cell identity being a cell identity of a transmitter of the first message, the first discovery message comprising a first link-layer identity of the transmitter of the first signal; evaluating a first measurement result according to a first reference signal resource; and evaluating a second measurement result according to a sidelink signal transmitted by a transmitter of the first discovery message; and the first transmitter, transmitting a third message via the direct path, the third message indicating the first link-layer identity, wherein the first message indicates a switch from a direct path to an indirect path when a first condition is satisfied, the first condition comprises that the first measurement result is lower than a first threshold and the second measurement result is higher than a second threshold, the first message comprises the first link-layer identity, the first condition is satisfied, and a configuration associated with the first condition in the first message being performed is used for triggering a start of the first timer.

2. The first node according to claim 1, wherein the first signal is a signal between a User Equipment (UE) and a relay, which is generated by PC5 Radio Link Control (PC5-RLC), the first signal being an Acknowledgement (ACK).

3. The first node according to claim 1, wherein the first signal is received from a User Equipment (UE) to Network (U2N) relay of the first node, and the first signal is received from a Layer 2 (L2) relay.

4. The first node according to claim 3, wherein the first node is a User Equipment (UE) to Network (U2N) remote UE, and when the U2N remote UE is in an RRC_IDLE state or an RRC_INACTIVE state, a U2N relay UE is in the RRC_IDLE state or the RRC_INACTIVE state.

5. The first node according to claim 1, wherein the first timer is not a T304.

6. The first node according to claim 1, wherein the first node is a User Equipment (UE) to Network (U2N) remote UE, and when the U2N remote UE is in an RRC_IDLE state or an RRC_INACTIVE state, a U2N relay UE is in the RRC_IDLE state or the RRC_INACTIVE state.

7. The first node according to claim 1, wherein switching from the direct path to the indirect path comprises at least transmitting a Packet Data Convergence Protocol (PDCP) status report.

8. A first node for wireless communications, comprising:

a first receiver, receiving a first message indicating a switch from a direct path to an indirect path; and starting a first timer, wherein an expiration of the first timer triggers a Radio Resource Control (RRC) re-establishment;

the first receiver, receiving a first signal on a sidelink after starting a first timer and before the expiration of the first timer; and stopping the first timer in response to receiving the first signal;

a first transmitter, transmitting a second message used for feedback of the first message, wherein the first message is transmitted via the direct path, the second message is transmitted via the indirect path, the first and second messages are RRC messages, the second message is relayed by a transmitter of the first signal, and the first message is used for starting the first timer, wherein the RRC re-establishment comprises:

selecting a third node, the third node belonging to a first candidate relay list, and the first candidate relay list being related to the switch from the direct path to the indirect path;

transmitting an RRC re-establishment request message via the third node using the indirect path; and deleting the first candidate relay list in response to applying the first message, and wherein during a procedure while the first message is applied, a first candidate cell list is reserved, the first candidate cell list being related to a conditional reconfiguration, and wherein the first candidate cell list comprises at least one cell.

9. The first node according to claim 8, wherein the first timer is not a T304.

10. The first node according to claim 9, wherein the first node is a User Equipment (UE) to Network (U2N) remote UE, and when the U2N remote UE is in an RRC_IDLE state or an RRC_INACTIVE state, a U2N relay UE is in the RRC_IDLE state or the RRC_INACTIVE state.

11. The first node according to claim 8, wherein the first node is a User Equipment (UE) to Network (U2N) remote UE, and when the U2N remote UE is in an RRC_IDLE state or an RRC_INACTIVE state, a U2N relay UE is in the RRC_IDLE state or the RRC_INACTIVE state.

12. The first node according to claim 8, wherein switching from the direct path to the indirect path comprises at least transmitting a Packet Data Convergence Protocol (PDCP) status report.

13. The first node according to claim 8, wherein the first signal is a signal between a User Equipment (UE) and a relay, which is generated by PC5 Radio Link Control (PC5-RLC), the first signal being an Acknowledgement (ACK).

14. A first node for wireless communications, comprising:

a first receiver, receiving a first message indicating a switch from a direct path to an indirect path; and starting a first timer, wherein an expiration of the first timer triggers a Radio Resource Control (RRC) re-establishment;

the first receiver, receiving a first signal on a sidelink after starting a first timer and before the expiration of the first timer; and stopping the first timer in response to receiving the first signal;

a first transmitter, transmitting a second message used for feedback of the first message, wherein the first message is transmitted via the direct path, the second message is transmitted via the indirect path, the first and second messages are RRC messages, the second message is relayed by a transmitter of the first signal, and the first message is used for starting the first timer; and the first receiver, during a time while the first timer is running, maintains a conditional reconfiguration evaluation for a conditional handover (CHO), and stops an evaluation for a conditional switch from the direct path to the indirect path.

15. The first node according to claim 14, wherein the first signal is received from a User Equipment (UE) to Network (U2N) relay of the first node, and the first signal is received from a Layer 2 (L2) relay.

16. The first node according to claim 15, wherein the first node is a User Equipment (UE) to Network (U2N) remote UE, and when the U2N remote UE is in an RRC_IDLE state or an RRC_INACTIVE state, a U2N relay UE is in the RRC_IDLE state or the RRC_INACTIVE state.

17. The first node according to claim 14, wherein the first timer is not a T304.

18. The first node according to claim 14, wherein the first node is a User Equipment (UE) to Network (U2N) remote UE, and when the U2N remote UE is in an RRC_IDLE state or an RRC_INACTIVE state, a U2N relay UE is in the RRC_IDLE state or the RRC_INACTIVE state.

19. The first node according to claim 14, wherein switching from the direct path to the indirect path comprises at least transmitting a Packet Data Convergence Protocol (PDCP) status report.

20. The first node according to claim 14, wherein the first signal is a signal between a User Equipment (UE) and a relay, which is generated by PC5 Radio Link Control (PC5-RLC), the first signal being an Acknowledgement (ACK).

* * * * *